United States Patent
Brueck et al.

(10) Patent No.: US 11,706,726 B2
(45) Date of Patent: Jul. 18, 2023

(54) DYNAMIC MONITORING MODES FOR SYNCHRONIZATION SIGNAL BLOCK TRANSMISSIONS

(71) Applicant: QUALCOMM Incorporated, San Diego, CA (US)

(72) Inventors: Stefan Brueck, Neunkirchen am Brand (DE); Yong Li, San Diego, CA (US); Arash Mirbagheri, San Diego, CA (US); Chen Kolikant, Tzofit (IL)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 17/199,346

(22) Filed: Mar. 11, 2021

(65) Prior Publication Data

US 2021/0289456 A1  Sep. 16, 2021

Related U.S. Application Data

(60) Provisional application No. 62/990,366, filed on Mar. 16, 2020.

(51) Int. Cl.
*H04W 56/00* (2009.01)
*H04W 74/08* (2009.01)
*H04W 24/08* (2009.01)

(52) U.S. Cl.
CPC ......... *H04W 56/001* (2013.01); *H04W 24/08* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 2021/0360464 A1* | 11/2021 | Zheng | H04W 52/0209 |
| 2021/0385676 A1* | 12/2021 | Yu | H04W 56/001 |
| 2022/0201581 A1* | 6/2022 | Li | H04W 36/0058 |

* cited by examiner

*Primary Examiner* — Saad Khawar
(74) *Attorney, Agent, or Firm* — Holland & Hart LLP

(57) ABSTRACT

Methods, systems, and devices for dynamic monitoring modes for synchronization signal block (SSB) transmissions are described. A user equipment (UE) may monitor one or more first SSB transmission opportunities for SSB transmissions from a base station and determine an SSB failure rate. Based on the failure rate, the UE may select a mode for monitoring one or more second SSB transmission opportunities. For example, if the failure rate is greater than a threshold, the UE may select a first mode for monitoring a first quantity of the one or more second SSB transmission opportunities. Additionally, if the failure rate is less than the threshold, the UE may select a second mode for monitoring a second quantity different than the first quantity of the one or more second SSB transmission opportunities. The UE may monitor the one or more second SSB transmission opportunities according to the selected mode for monitoring.

28 Claims, 12 Drawing Sheets

DYNAMIC MONITORING MODES FOR SYNCHRONIZATION SIGNAL BLOCK TRANSMISSIONS

CROSS REFERENCE

The present Application for Patent claims the benefit of U.S. Provisional Patent Application No. 62/990,366 by BRUECK et al., entitled "DYNAMIC MONITORING MODES FOR SYNCHRONIZATION SIGNAL BLOCK TRANSMISSIONS," filed Mar. 16, 2020, assigned to the assignee hereof, and expressly incorporated by reference herein.

FIELD OF TECHNOLOGY

The following relates generally to wireless communications and more specifically to dynamic monitoring modes for synchronization signal block (SSB) transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support dynamic monitoring modes for synchronization signal block (SSB) transmissions. In some examples, a user equipment (UE) may monitor a set of SSB transmission opportunities within a duration, such as a discovery burst window, for SSB transmissions from a base station. The UE may determine, based on a quantity of SSB transmissions received while monitoring the SSB transmission opportunities, a failure rate of the SSB transmissions. Based on the failure rate of the SSB transmissions, the UE may dynamically select a mode for monitoring SSB transmission opportunities during a future duration, such as a discovery burst window. For example, if the failure rate exceeds a threshold, the UE may select a first mode for monitoring. Additionally or alternatively, if the failure rate is less than the threshold, the UE may select a second mode for monitoring. In some examples, the first mode for monitoring may be associated with monitoring a first quantity of SSB transmission opportunities while the second mode for monitoring may be associated with monitoring a second quantity different than (e.g., less than) a first quantity of SSB transmission opportunities. That is, when the UE operates according to the first mode for monitoring, the UE may monitor more SSB transmission opportunities within a discovery burst window compared to the UE operating according to the second mode for monitoring. Thus, the UE may dynamically select a mode for monitoring based on the failure rate of SSB transmissions, among other factors or conditions.

A method of wireless communication at a UE is described. The method may include monitoring one or more first SSB transmission opportunities for one or more SSB transmissions, determining a failure rate of the one or more SSB transmissions based on monitoring the one or more first SSB transmission opportunities, selecting a mode for monitoring one or more second SSB transmission opportunities based on the failure rate of the one or more SSB transmissions relative to a threshold, where selecting the mode for monitoring includes selecting the mode from a set that includes a first mode for monitoring a first quantity of the one or more second SSB transmission opportunities and a second mode for monitoring a second quantity less than the first quantity of the one or more second SSB transmission opportunities, and monitoring at least one of the one or more second SSB transmission opportunities according to the mode for monitoring.

An apparatus for wireless communication at a UE is described. The apparatus may include a processor, memory coupled with the processor, and instructions stored in the memory. The instructions may be executable by the processor to cause the apparatus to monitor one or more first SSB transmission opportunities for one or more SSB transmissions, determine a failure rate of the one or more SSB transmissions based on monitoring the one or more first SSB transmission opportunities, select a mode for monitoring one or more second SSB transmission opportunities based on the failure rate of the one or more SSB transmissions relative to a threshold, where selecting the mode for monitoring includes selecting the mode from a set that includes a first mode for monitoring a first quantity of the one or more second SSB transmission opportunities and a second mode for monitoring a second quantity less than the first quantity of the one or more second SSB transmission opportunities, and monitor at least one of the one or more second SSB transmission opportunities according to the mode for monitoring.

Another apparatus for wireless communication at a UE is described. The apparatus may include means for monitoring one or more first SSB transmission opportunities for one or more SSB transmissions, determining a failure rate of the one or more SSB transmissions based on monitoring the one or more first SSB transmission opportunities, selecting a mode for monitoring one or more second SSB transmission opportunities based on the failure rate of the one or more SSB transmissions relative to a threshold, where selecting the mode for monitoring includes selecting the mode from a set that includes a first mode for monitoring a first quantity of the one or more second SSB transmission opportunities and a second mode for monitoring a second quantity less than the first quantity of the one or more second SSB transmission opportunities, and monitoring at least one of the one or more second SSB transmission opportunities according to the mode for monitoring.

A non-transitory computer-readable medium storing code for wireless communication at a UE is described. The code may include instructions executable by a processor to monitor one or more first SSB transmission opportunities for one or more SSB transmissions, determine a failure rate of the one or more SSB transmissions based on monitoring the one or more first SSB transmission opportunities, select a mode for monitoring one or more second SSB transmission opportunities based on the failure rate of the one or more SSB transmissions relative to a threshold, where selecting the mode for monitoring includes selecting the mode from a set that includes a first mode for monitoring a first quantity of the one or more second SSB transmission opportunities and a second mode for monitoring a second quantity less than the first quantity of the one or more second SSB transmission opportunities, and monitor at least one of the one or more second SSB transmission opportunities according to the mode for monitoring.

In some examples of the method, apparatuses, and non-transitory computer-readable medium described herein, selecting the mode for monitoring one or more second SSB transmission opportunities may include operations, features, means, or instructions for selecting the first mode when the failure rate of the one or more SSB transmissions may be greater than the threshold; and selecting the second mode when the failure rate of the one or more SSB transmissions may be less than the threshold.

In some examples of the method, apparatuses, and non-transitory computer-readable medium described herein, the first quantity of the one or more second SSB transmission opportunities may be associated with a first set of quasi-collocated SSB transmissions.

In some examples of the method, apparatuses, and non-transitory computer-readable medium described herein, the second SSB transmission opportunities include a second set of quasi-collocated SSB transmissions that includes the first set of quasi-collocated SSB transmissions.

In some examples of the method, apparatuses, and non-transitory computer-readable medium described herein, the second quantity of the one or more second SSB transmission opportunities includes a single SSB transmission opportunity of the one or more second SSB transmission opportunities.

Some examples of the method, apparatuses, and non-transitory computer-readable medium described herein may further include operations, features, means, or instructions for detecting one or more SSB transmissions based on monitoring at least one of the one or more second SSB transmission opportunities according to the first mode, determining that the one or more detected SSB transmissions satisfy a criterion, and refraining from monitoring at least one of the first quantity of the one or more second SSB transmission opportunities based on determining that the one or more detected SSB transmissions satisfy the criterion.

In some examples of the method, apparatuses, and non-transitory computer-readable medium described herein, determining that the one or more detected SSB transmissions satisfy the criterion may include operations, features, means, or instructions for determining that a quantity of the one or more detected SSB transmissions that satisfy the criterion exceeds a quantity of at least one SSB transmission; determining that a signal to noise ratio of the one or more detected SSB transmissions exceeds a second threshold; or determining that a received signal power of the one or more detected SSB transmission exceeds a second threshold.

Some examples of the method, apparatuses, and non-transitory computer-readable medium described herein may further include operations, features, means, or instructions for comparing the failure rate of the one or more SSB transmissions to the threshold, where selecting the mode for monitoring one or more second SSB transmission opportunities may be based on comparing the failure rate of the one or more SSB transmissions to the threshold.

Some examples of the method, apparatuses, and non-transitory computer-readable medium described herein may further include operations, features, means, or instructions for detecting one or more SSB transmission failures based on failing to detect at least one SSB transmission, where determining the failure rate of the one or more SSB transmissions may be based on the one or more detected SSB transmission failures.

In some examples of the method, apparatuses, and non-transitory computer-readable medium described herein, monitoring the one or more first SSB transmission opportunities may include operations, features, means, or instructions for monitoring the one or more first SSB transmission opportunities according to the first mode or the second mode.

In some examples of the method, apparatuses, and non-transitory computer-readable medium described herein, the threshold may be preconfigured for the UE according to a deployment implementation of the UE, where selecting the mode for monitoring may be based on the failure rate of the one or more SSB transmissions relative to the preconfigured threshold.

In some examples of the method, apparatuses, and non-transitory computer-readable medium described herein, the deployment implementation of the UE includes a frame based equipment deployment scenario or a load based equipment deployment scenario.

In some examples of the method, apparatuses, and non-transitory computer-readable medium described herein, determining the failure rate of the one or more SSB transmissions may include operations, features, means, or instructions for determining the failure rate of the one or more SSB transmissions based on a failure rate for a listen before talk (LBT) procedure associated with a base station.

DETAILED DESCRIPTION

Figure 1:
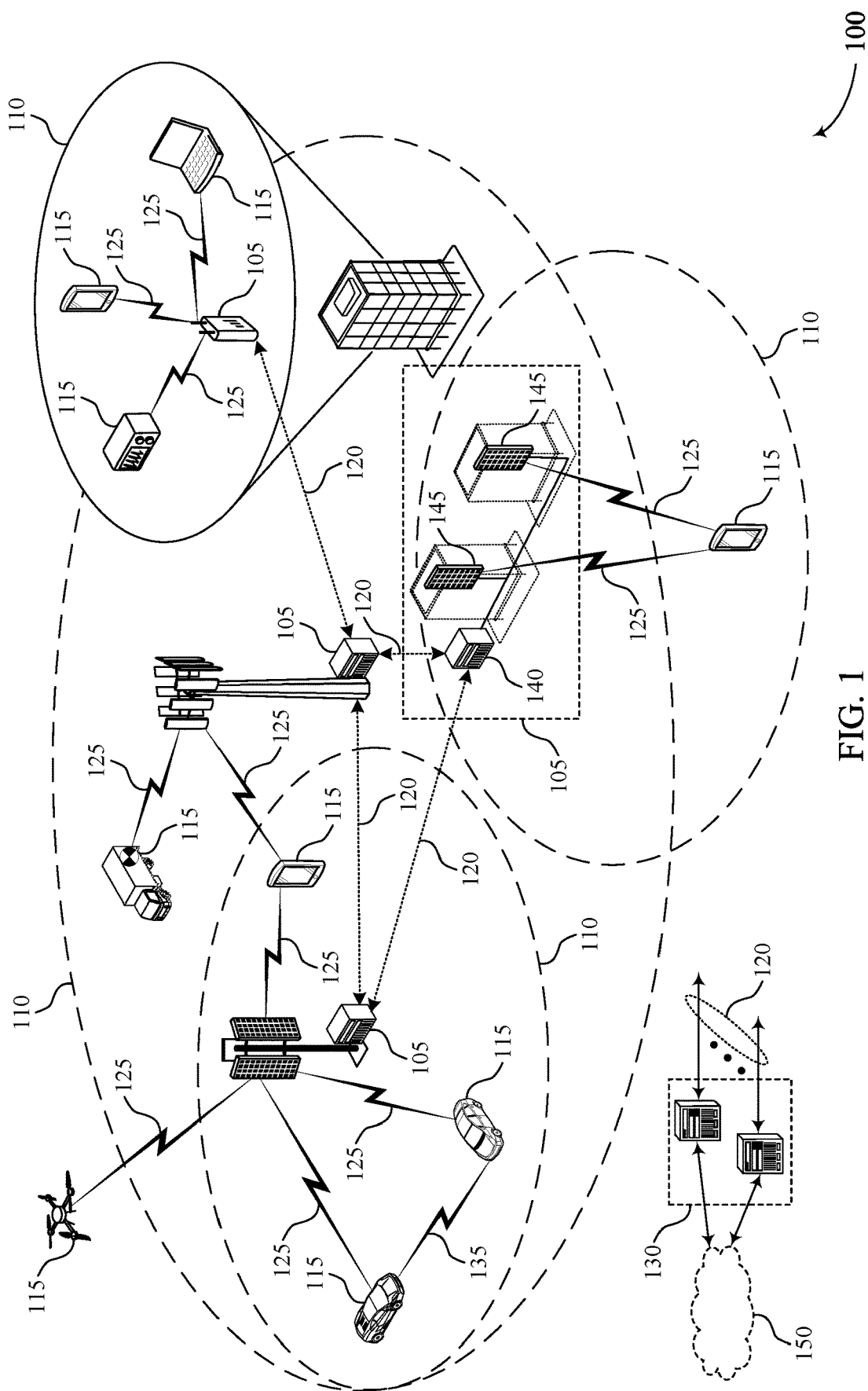
FIG. 1 illustrates an example of a system for wireless communications that supports dynamic monitoring modes for synchronization signal block (SSB) transmissions in accordance with aspects of the present disclosure.

In some wireless communications systems, a base station may transmit one or more SSB transmissions within a duration, such as a discovery burst window, including a set of SSB transmission opportunities. Before transmitting an SSB transmission during an SSB transmission opportunity, in some examples, the base station may perform a listen-before-talk (LBT) procedure. If the LBT procedure is successful, the base station may transmit the SSB during the SSB transmission opportunity (e.g., by a physical broadcast channel (PBCH)). If one or more LBT procedures fail, the base station may refrain from transmitting the SSB during the SSB transmission opportunity. Thus, a base station may transmit fewer SSBs within a duration when the LBT failure rate is relatively high compared to the quantity of SSBs the base station transmits when the LBT failure rate is relatively low. In some examples, a user equipment (UE) may dynamically change a mode of monitoring for SSB transmissions within the duration based at least in part on the LBT failure rate. That is, in some examples, the UE may monitor more SSB transmission opportunities in a case where the LBT failure rate is greater than a threshold. In some examples, the UE may monitor fewer SSB transmission opportunities in a case where the LBT failure rate is less than the threshold.

The UE may determine an LBT failure rate based on a quantity of SSB transmissions detected within one or more previously-monitored discovery windows. For example, the UE may monitor a set of SSB transmission opportunities within a discovery burst window for SSB transmissions from a base station. The UE may determine, based on a quantity of SSB transmissions received while monitoring the SSB transmission opportunities, a failure rate of the SSB transmissions. Based on the failure rate of the SSB transmissions, the UE may dynamically select a mode for monitoring SSB transmission opportunities during a future discovery burst window. For example, if the failure rate exceeds a threshold, the UE may select a first mode for monitoring a first quantity of SSB transmission opportunities. Additionally or alternatively, if the failure rate is less than the threshold, the UE may select a second mode for monitoring a second quantity of SSB transmission opportunities less than the first quantity. That is, when the UE operates according to the first mode for monitoring, the UE may maximize reliability by monitoring more SSB transmission opportunities within a discovery burst window when compared to a UE operating according to the second mode for monitoring. Additionally or alternatively, when the UE operates according to the second mode for monitoring, the UE may minimize power consumption by monitoring fewer SSB transmission opportunities within the discover burst window when compared to a UE operating according to the first mode.

Aspects of the disclosure are initially described in the context of wireless communications systems. Aspects of the disclosure are then described with reference to SSB configurations and a process flow. Aspects of the disclosure are further illustrated by and described with reference to apparatus diagrams, system diagrams, and flowcharts that relate to dynamic monitoring modes for SSB transmissions.

FIG. 1 illustrates an example of a wireless communications system 100 that supports dynamic monitoring modes for SSB transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. In some examples, a base station 105 may transmit synchronization signals (e.g., PSS SSS, and the like) using multiple beams in a beam-sweeping manner through a cell coverage area. In some examples, PSS, SSS, may be transmitted within different SSBs on respective directional beams (e.g., associated with different quasi-collocations (QCLs)).

In some wireless communications systems, a base station 105 may transmit one or more SSB transmissions within a discovery burst window that includes a set of SSB transmission opportunities. Before transmitting an SSB transmission, the base station 105 may perform an LBT procedure. If the LBT procedure is successful, the base station 105 may transmit the SSB during the SSB transmission opportunity by a PBCH. Additionally, if the LBT procedure fails, the base station 105 may refrain from transmitting the SSB during the SSB transmission opportunity. Thus, a base station 105 may transmit more SSBs within a discovery burst window when the LBT failure rate is relatively high when compared to the quantity of SSBs the base station 105 transmits when the LBT failure rate is relatively low. In some examples, a UE 115 may dynamically change a mode of monitoring for SSB transmissions within the discovery burst window based on the LBT failure rate. That is, the UE 115 may monitor more SSB transmission opportunities in a case that the LBT failure rate is greater than a threshold.

Additionally, the UE 115 may monitor fewer SSB transmission opportunities in a case that the LBT failure rate is less than the threshold.

The UE 115 may determine an LBT failure rate based on a quantity of SSB transmissions detected within one or more previously-monitored discovery windows. For example, the UE 115 may monitor a set of SSB transmission opportunities within a discovery burst window for SSB transmissions from a base station 105. The UE 115 may determine, based on a quantity of SSB transmissions received while monitoring the SSB transmission opportunities, a failure rate of the SSB transmissions. Based on the failure rate of the SSB transmissions, the UE 115 may dynamically select a mode for monitoring SSB transmission opportunities during a future discovery burst window. For example, if the failure rate exceeds a threshold, the UE 115 may select a first mode for monitoring a first quantity of SSB transmission opportunities. Additionally or alternatively, if the failure rate is less than the threshold, the UE 115 may select a second mode for monitoring a second quantity of SSB transmission opportunities less than the first quantity. That is, when the UE 115 operates according to the first mode for monitoring, the UE 115 may maximize reliability by monitoring more SSB transmission opportunities within a discovery burst window when compared to a UE 115 operating according to the second mode for monitoring. Additionally, when the UE 115 operates according to the second mode for monitoring, the UE 115 may minimize power consumption by monitoring fewer SSB transmission opportunities within the discover burst window when compared to a UE 115 operating according to the first mode.

Figure 2:
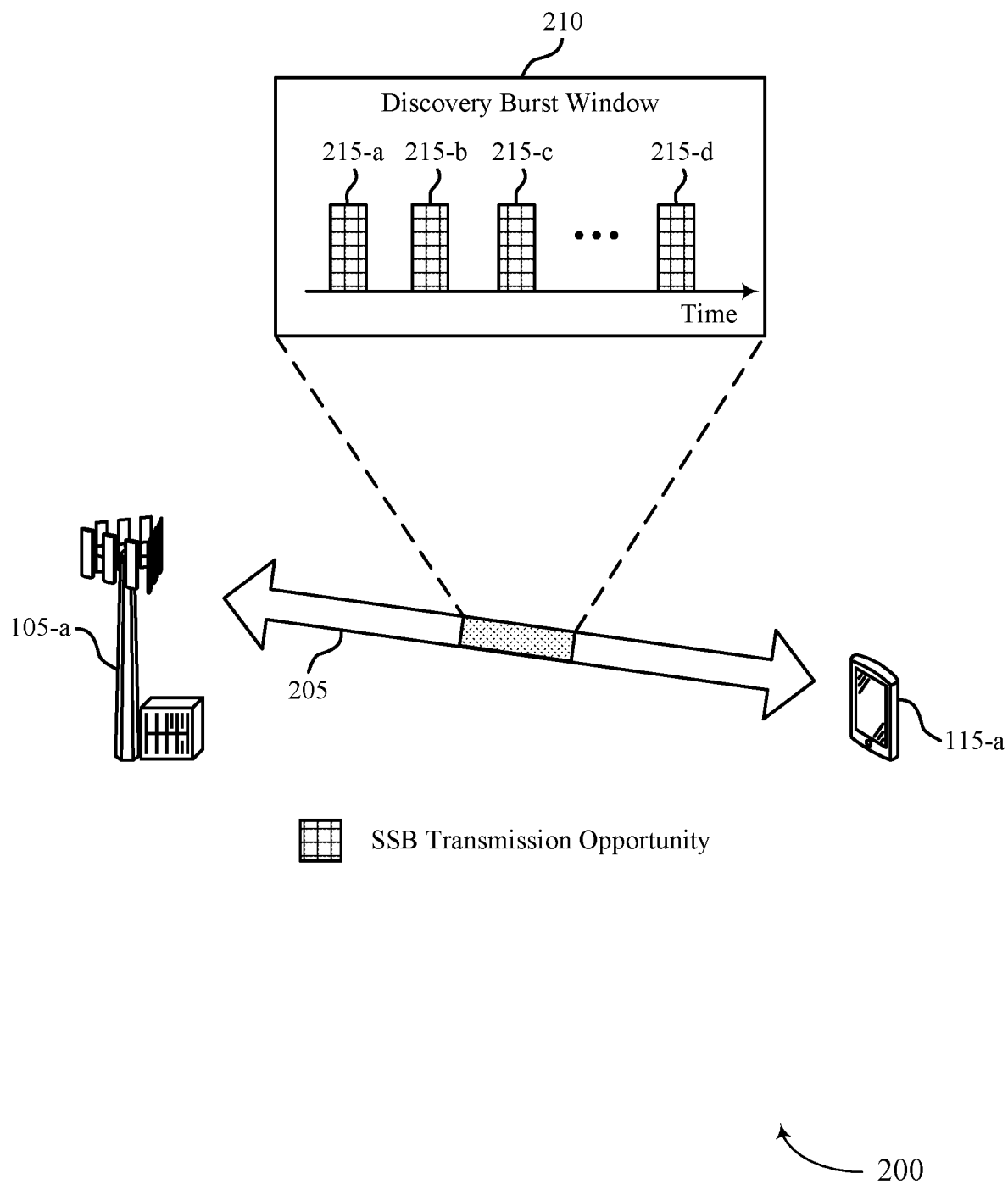
FIG. 2 illustrates an example of a system for wireless communications that supports dynamic monitoring modes for SSB transmissions in accordance with aspects of the present disclosure.

FIG. 2 illustrates an example of a wireless communications system 200 that supports dynamic monitoring modes for SSB transmissions in accordance with aspects of the present disclosure. In some examples, wireless communications system 200 may implement aspects of wireless communications system 100 such as base station 105-$a$ and UE 115-$a$, which may be examples of base stations 105 and UEs 115 as described with reference to FIG. 1.

The base station 105-$a$ may be configured to transmit SSBs within a duration, such as a discovery burst window 210. The SSBs may include PSS transmissions, SSS transmissions, and other broadcast transmissions sent via the PBCH. In some examples, the discovery burst window 210 may span a configurable amount of time (e.g., between 0.5 ms and 5 ms) and may include one or more SSB transmission opportunities 215. In some examples, a quantity of SSB transmission opportunities 215 within the discovery burst window 210 may be based on a subcarrier spacing for the carrier 205. For example, in a case that the subcarrier spacing of the carrier 205 is 15 kHz, the discovery burst window 210 may include a first quantity of SSB transmission opportunities 215 (e.g., ten). Additionally, in a case that the subcarrier spacing of the carrier 205 is 30 kHz, the discovery burst window 210 may include a second quantity of SSB transmission opportunities 215 (e.g., twenty).

Before transmitting an SSB within one of the SSB transmission opportunities 215, the base station 105-$a$ may perform an LBT procedure. If the LBT procedure is successful, the base station 105-$a$ may transmit the SSB during the SSB transmission opportunity 215. Additionally, if the LBT procedure fails, the base station 105-$a$ may refrain from transmitting the SSB during the SSB transmission opportunity 215. Thus, the base station 105-$a$ may transmit fewer SSBs within a discovery burst window 210 when the LBT failure rate is relatively high when compared to the quantity of SSBs the base station 105-$a$ transmits when the LBT failure rate is relatively low.

Each of the SSB transmission opportunities 215 may be associated with a quasi-collocation (QCL) relationship with another SSB transmission opportunity 215 within the discovery burst window 210. The QCL relationships between the SSB transmission opportunities 215 may be indicated by a parameter (e.g., Q) signaled to the UE 115-$a$ (e.g., by radio resource control (RRC) signaling). The parameter may indicate a value (e.g., 1, 2, 4, 8) associated with a periodicity of quasi-collocated SSB transmission opportunities 215. For example, a value of '2' may indicate that every other SSB transmission opportunity 215 is associated with a quasi-collocated SSB transmission. Based on the indicated QCL relationship, the UE 115-$a$ may determine a receive beam to utilize for receiving an SSB transmission within each SSB transmission opportunity 215. In some examples, the UE 115-$a$ may use a same receive beam to receive each SSB transmission that is quasi-collocated.

In some cases, the base station 105-$a$ may transmit an SSB during each SSB transmission opportunity 215 preceded by a successful LBT procedure. In some other cases, the base station 105-$a$ may transmit one SSB associated with each set of quasi-collocated SSB transmissions within the discovery burst window 210. That is, if the base station 105-$a$ performs a successful LBT procedure and transmits an SSB associated with a first set of quasi-collocated SSB transmissions, the base station 105-$a$ may refrain from transmitting the remaining SSB transmissions within the first set of quasi-collocated SSB transmissions. Here, the base station 105-$a$ may transmit no more than one SSB within each set of quasi-collocated SSB transmissions during the discovery burst window 210. In this example, the base station 105-$a$ may indicate to the UE 115-$a$ (e.g., by RRC signaling) that a single SSB transmission from each set of quasi-collocated SSB transmissions may be transmitted within the discovery burst window 210.

The UE 115-$a$ may be configured to monitor a subset of the SSB transmission opportunities 215 within the discovery burst window 210 according to a mode for monitoring. In a first mode for monitoring, the UE 115-$a$ may be configured to monitor a set of SSB transmission opportunities 215 that are quasi-collocated. In an example where every fourth SSB transmission opportunity 215 is quasi-collocated, the UE 115-$a$ may monitor every fourth SSB transmission opportunity 215 associated with a receive beam of the UE 115-$a$. In another example, where every eighth SSB transmission opportunity 215 is associated with quasi-collocated SSB transmissions, the UE 115-$a$ may monitor every eighth SSB transmission opportunity 215 associated with the receive beam of the UE 115-$a$.

In cases when the UE 115-$a$ is monitoring for SSB transmissions within the discovery burst window 210 according to the first mode, the UE 115-$a$ may determine to stop monitoring SSB transmission opportunities 215 if the UE 115-$a$ detects a predefined quantity (e.g., one or more) of SSB transmissions that satisfy one or more criteria. That is, the UE 115-$a$ may perform an early exit (e.g., from monitoring within the discovery burst window 210 according to the first mode) if the predefined quantity of detected SSB transmissions satisfy the one or more criteria. For example, the UE 115-$a$ may detect one or more SSB transmissions with a signal power (e.g., reference signal receive power (RSRP)) or a signal to noise ratio that satisfy the one or more criteria. Here, the UE 115-$a$ may compare the SNR or signal power of each detected SSB transmission to a first threshold or a second threshold, respectively. If the number of SSB transmissions where the SNR or signal power exceeds the threshold is equal to the predefined quantity of detected SSB transmissions, the UE 115-*a* may refrain from monitoring the remaining SSB transmission opportunities 215 within the discovery burst window 210 that are associated with quasi-collocated SSB transmissions. For example, the UE 115-*a* may be configured to monitor a set of SSB transmission opportunities 215 including SSB transmission opportunities 215-*b* and 215-*d*. Here, if the UE 115-*a* detects the predefined quantity of SSB transmissions that satisfy the one or more criteria while monitoring the SSB transmission opportunity 215-, the UE 115-*a* may stop monitoring the remaining SSB transmission opportunities 215 within the discovery burst window 210 (e.g., including the SSB transmission opportunity 215-*d*).

In a second mode for monitoring, the UE 115-*a* may be configured to monitor fewer SSB transmission opportunities 215 when compared to the first mode. For example, the UE 115-*a* may be configured to monitor a single SSB transmission opportunity 215 within the discovery burst window 210. The SSB transmission opportunity 215 monitored by the UE 115-*a* operating in the second mode may be configurable. For example, the UE 115-*a* may determine to monitor one of the SSB transmission opportunities 215 that are associated with SSB transmissions with a QCL relationship associated with a receive beam of the UE 115-*a*. That is, the UE 115-*a* may determine a set of SSB transmission opportunities 215 that are quasi-collocated and are associated with a high level of reliability (e.g., reliably detected and decoded by the UE 115-*a*). Additionally, the UE 115-*a* may select an SSB transmission opportunity 215 to monitor from the set of quasi-collocated SSB transmission opportunities 215 based on an SSB transmission opportunity 215 associated with a best SSB transmission (e.g., a highest signal power or a highest SNR ratio). When the UE 115-*a* monitors for SSB transmissions according to the second mode, the UE 115-*a* may consume less power than a case where the UE 115-*a* monitors for SSB transmissions according to the first mode. Additionally, when the UE 115-*a* monitors for SSB transmissions according to the first mode, the reliability of the SSB transmissions (e.g., the likelihood of the UE 115-*a* detecting and decoding an SSB transmission within the discovery burst window 210) may increase when compared to the UE 115-*a* monitoring for SSB transmissions according to the second mode (e.g., depending on an LBT failure rate at the base station).

In some examples, the UE 115-*a* may dynamically change a mode of monitoring for SSB transmissions within the discovery burst window 210 based on the LBT failure rate. That is, if the LBT failure rate is below a threshold, the UE 115-*a* may monitor for SSB transmissions within the discovery burst window 210 according to the second mode, thus conserving power. Additionally, if the LBT failure rate exceeds the threshold, the UE 115-*a* may elect to increase a reliability of the SSB transmissions and monitor for the SSB transmissions within the discovery burst window 210 according to the first mode. The UE 115-*a* may be unaware of the LBT failure rate of the base station 105-*a*. Therefore, the UE 115- may utilize an SSB transmission failure rate to select the mode for monitoring. The UE 115-*a* may determine the LBT failure rate based on monitoring for SSB transmissions within a discovery burst window 210. For example, the UE 115-*a* may monitor four SSB transmission opportunities 215 within the discovery burst window 210 and detect two SSB transmissions. Thus, the UE 115-*a* may determine a 50% SSB transmission failure rate for that discovery burst window 210. In another example (e.g., when the base station 105-*a* is configured to transmit a single SSB transmission from each set of quasi-collocated SSB transmissions), the UE 115-*a* may determine 100% SSB transmission failure rate or a 0% SSB transmission failure rate based on whether the UE 115-*a* detects the single SSB transmission from the base station 105-*a*.

The UE 115-*a* may compare the determined SSB transmission failure rate to a threshold to determine which mode for monitoring to select. In some examples, the threshold may be static. In some other cases, the threshold may be dynamic based on one or more factors, such as a deployment scenario of the UE 115-*a*. That is, the UE 115-*a* may be used within an industrial internet of things (IIOT) deployment scenario. Here, the UE 115-*a* may be a frame-based equipment (FBE). In this example, power consumption may be a prioritized metric for the performance of the UE 115-*a*. Therefore, the UE 115-*a* may be configured for monitoring SSB transmission opportunities 215 according to the second mode for monitoring. Thus, the threshold may be different (e.g., higher, lower) for the FBE deployment scenario when compared to a load-based equipment (LBE) deployment scenario. For example, a determined SSB transmission failure rate may be above the threshold for an LBE deployment scenario (e.g., resulting in the UE 115-*a* selecting the first mode for monitoring) but below the threshold for an FBE deployment scenario (e.g., resulting in the UE 115-*a* selecting the second mode for monitoring), among other examples.

Figure 3A:
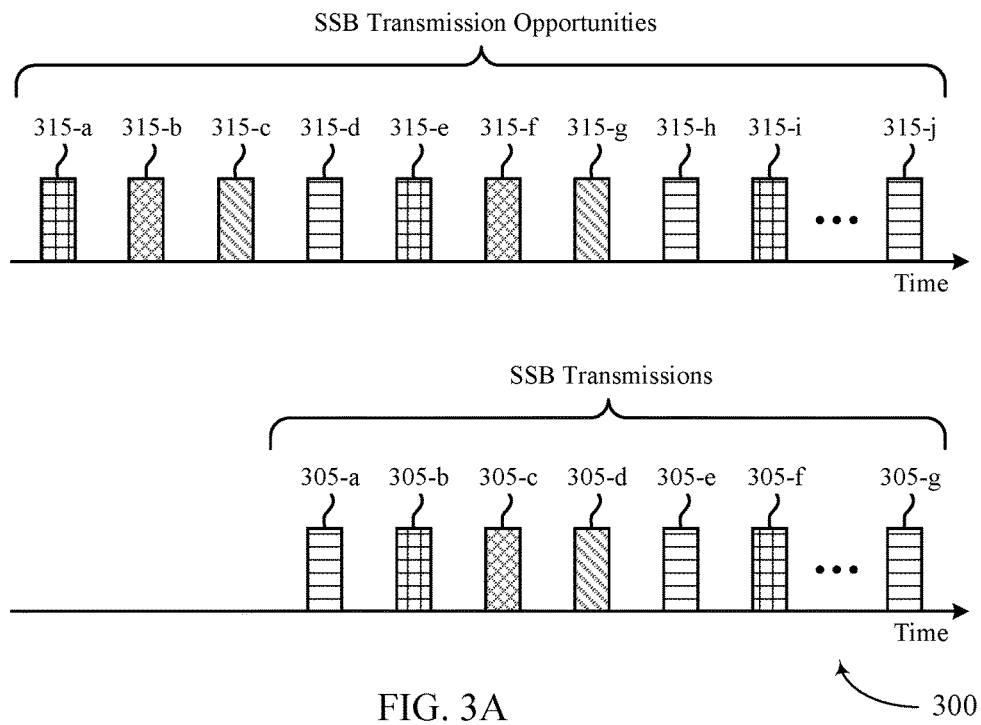
FIGS. 3A and 3B illustrate example SSB configurations that supports dynamic monitoring modes for SSB transmissions in accordance with aspects of the present disclosure.
Figure 3B:
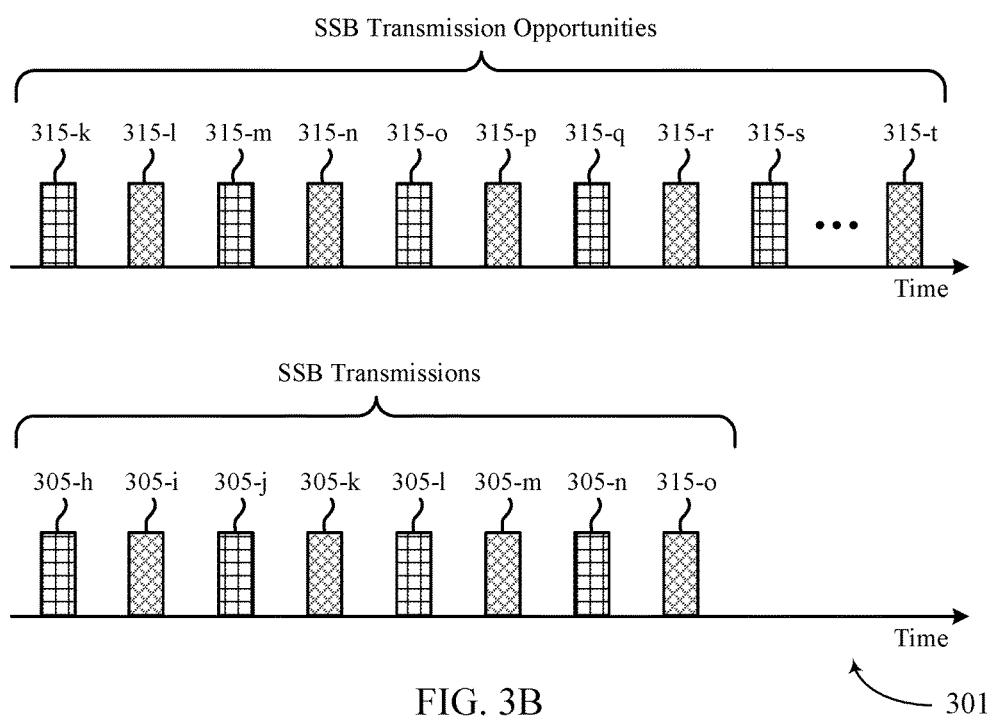

FIGS. 3A and 3B illustrate examples of SSB configurations 300 and 301 that support dynamic monitoring modes for SSB transmissions in accordance with aspects of the present disclosure. In some examples, the SSB configurations 300 and 301 may be implemented by aspects of wireless communications system 100. For example, the SSB configurations 300 and 301 may illustrate SSB transmission opportunities 315 within a discovery burst window as described with reference to FIG. 2. Additionally, the SSB configurations 300 may further illustrate SSB transmissions 305 from a base station to a UE as described with reference to FIGS. 1 and 2. The SSB configurations 300 and 301 may illustrate different periodicities of quasi-collocated SSB transmissions 305 as well as different LBT procedure outcomes.

FIG. 3A illustrates SSB configuration 300 including the SSB transmission opportunities 315 and SSB transmissions 305. In the example of SSB configuration 300, a discovery burst window may include a quantity of SSB transmission opportunities 315 (e.g., ten, twenty). Each SSB transmission opportunity 315 may be associated with an SSB transmission 305 that is quasi-collocated with one or more other SSB transmissions 305 planned for the discovery burst window. In the example of SSB configuration 300, the periodicity of quasi-collocated SSB transmissions 305 may be four. That is, a base station may transmit a parameter (e.g., Q) by RRC signaling to a UE indicating a value of '4.' Thus, every fourth SSB transmission opportunity 315 may be associated with a quasi-collocated SSB transmission 305. For example, SSB transmission opportunities 315-*a*, 315-*e*, and 315-*i* may be associated with quasi-collocated SSB transmissions 305. Additionally, SSB transmission opportunities 315-*d*, 315-*h*, and 315-*j* may also be associated with quasi-collocated SSB transmissions 305.

In the example of SSB configuration 300, a base station may perform an LBT procedure before transmitting an SSB transmission 305 within a corresponding SSB transmission opportunity 315. That is, the base station may perform an LBT procedure before SSB transmission opportunity 315-*a*. Here, the LBT procedure may result in an LBT failure (e.g., the base station may fail to gain access to the channel). Therefore, the base station may refrain from transmitting an SSB transmission 305 during the SSB transmission opportunity 315-*a*. In this example, a UE configured to monitor the SSB transmission opportunity 315-*a* may detect an SSB transmission failure based on failing to detect an SSB transmission 305 during the SSB transmission opportunity 315-*a*.

The base station may perform an LBT procedure before SSB transmission opportunity 315-*e* (e.g., associated with an SSB transmission 305-*e* that is quasi-collocated with an SSB transmission associated with the SSB transmission opportunity 315-*a*) resulting in an LBT success. Here, the base station may transmit the SSB transmission 305-*b* during the corresponding SSB transmission opportunity 315-*e*. In this example, a UE configured to monitor the SSB transmission opportunity 315-*e* may detect an SSB transmission success based on detecting the SSB transmission 305-*b* during the SSB transmission opportunity 315-*e*.

The UE may be configured to monitor one or more of the SSB transmission opportunities 315 according to a mode for monitoring. In one example, the UE may monitor one or more of the SSB transmission opportunities 315 according to a first mode for monitoring. Here, the UE may be configured to monitor each SSB transmission opportunity 315 associated with SSB transmissions 305 that are quasi-collocated. For example, the UE may be configured to monitor the SSB transmission opportunities 315-*b* and 315-*f*, which are each associated with quasi-collocated SSB transmissions 305.

If the UE is monitoring the SSB transmission opportunities 315 according to the first mode for monitoring, the UE may detect a predefined quantity (e.g., one or more) of SSB transmissions 305 that satisfy a criterion and refrain from monitoring any remaining SSB transmission opportunities 315 within the discovery burst window. For example, the UE may be configured to monitor SSB transmission opportunities 315-*d*, 315-*h*, and 315-*j* (e.g., associated with quasi-collocated SSB transmissions 305-*a*, 305-*e*, and 305-*g*, respectively). Here, the UE may detect the SSB transmission 305-*a* transmitted during the SSB transmission opportunity 315-*d*. The UE may compare a detected signal power metric (e.g., an RSRP) or a signal to noise ratio metric to a threshold. If the detected signal power metric or signal to noise ratio metric exceeds the threshold, the UE may determine that the SSB transmission 305-*a* satisfies the criterion. If the predefined quantity of detected SSB transmissions has not been detected, then the UE may continue to monitor SSB transmission opportunities 315. Once the predefined quantity of detected SSB transmissions has been detected, the UE may refrain from monitoring SSB transmission opportunities 315-*h* and 315-*j* during the discovery burst window. In some examples, this may decrease the power consumption of the UE when compared to a case when the UE continues to monitor one or more remaining SSB transmission opportunities 315.

Additionally or alternatively, the UE may be configured to monitor at least one SSB transmission opportunity 315 according to a second mode for monitoring. Here, the UE may monitor an SSB transmission opportunity 315 associated with a receive beam of the UE and associated with a best SSB transmission 305 (e.g., an SSB transmission 305 with a highest RSRP or signal to noise ratio). For example, the UE may be configured to monitor one SSB transmission opportunity 315 for an SSB transmission 305.

In either case, the UE may dynamically select the mode for monitoring based on the LBT failure rate associated with the discovery burst window. For example, the UE may determine an SSB transmission failure rate based on a quantity of SSB transmissions 305 that are detected within the monitored SSB transmission opportunities 315. If the SSB transmission failure rate is greater than a threshold, the UE may determine to monitor a future discovery burst window according to the first mode for monitoring. Additionally, if the SSB transmission failure rate is less than the threshold, the UE may determine to monitor a future discovery burst window according to the second mode for monitoring.

FIG. 3B illustrates SSB configuration 301 including the SSB transmission opportunities 315 and SSB transmissions 305. In the example of SSB configuration 301, a discovery burst window may include a quantity of SSB transmission opportunities 315 (e.g., ten, twenty). Each SSB transmission opportunity 315 may be associated with an SSB transmission 305 that is quasi-collocated with one or more other SSB transmissions 305 planned for the discovery burst window. In the example of SSB configuration 301, the periodicity of quasi-collocated SSB transmissions 305 may be two. That is, a base station may transmit a parameter (e.g., Q) by RRC signaling to a UE indicating a value of '2.' Thus, every second SSB transmission opportunity 315 may be associated with a quasi-collocated SSB transmission 305. For example, SSB transmission opportunities 315-*k*. 215-*m*, 315-*o*, 315-*q*, and 315-*t* may be associated with quasi-collocated SSB transmissions 305-*h*, 305-*j*, 305-*l*, and 305-*n*, respectively.

In the example of SSB configuration 301, a base station may perform an LBT procedure before transmitting an SSB transmission 305 within a corresponding SSB transmission opportunity 315. That is, the base station may perform an LBT procedure before SSB transmission opportunity 315-*k*. Here, the LBT procedure may result in an LBT success (e.g., the base station may gain access to the channel). Therefore, the base station may transmit an SSB transmission 305-*h* during the SSB transmission opportunity 315-*k*. In this example, a UE configured to monitor the SSB transmission opportunity 315-*k* may detect an SSB transmission success based on detecting SSB transmission 305-*h* during the SSB transmission opportunity 315-*k*.

The base station may perform an LBT procedure before SSB transmission opportunity 315-*s* resulting in an LBT failure (e.g., the base station may fail to gain access to the channel). Here, the base station may refrain from transmitting an SSB transmission 305 during the SSB transmission opportunity 315-*s*. In this example, a UE configured to monitor the SSB transmission opportunity 315-*s* may detect an SSB transmission failure based on failing to detect an SSB transmission 305 during the SSB transmission opportunity 315-*g*.

The UE may be configured to monitor one or more of the SSB transmission opportunities 315 according to a mode for monitoring. In one example, the UE may monitor one or more of the SSB transmission opportunities 315 according to a first mode for monitoring. Here, the UE may be configured to monitor each SSB transmission opportunity 315 associated with SSB transmissions 305 that are quasi-collocated. For example, the UE may be configured to monitor the SSB transmission opportunities 315-*l*, 315-*n*, 315-*p*, 315-*r*, and 315-*t*, which are each associated with a quasi-collocated SSB transmission 305. If the UE is monitoring the SSB transmission opportunities 315 according to the first mode for monitoring, the UE may detect a predefined quantity (e.g., one or more) of SSB transmissions 305 that satisfy a criterion and refrain from monitoring any remaining SSB transmission opportunities 315 within the discovery burst window.

Additionally or alternatively, the UE may be configured to monitor at least one SSB transmission opportunity 315 according to a second mode for monitoring. Here, the UE may monitor an SSB transmission opportunity 315 associated with a receive beam of the UE and associated with a best SSB transmission 305 (e.g., an SSB transmission 305 with a highest RSRP or signal to noise ratio). For example, the UE may be configured to monitor one SSB transmission opportunity 315 for an SSB transmission 305.

In either case, the UE may dynamically select the mode for monitoring based on the LBT failure rate associated with the discovery burst window. For example, the UE may determine an SSB transmission failure rate based on a quantity of SSB transmissions 305 that are detected within the monitored SSB transmission opportunities 315. If the SSB transmission failure rate is greater than a threshold, the UE may determine to monitor a future discovery burst window according to the first mode for monitoring. Additionally, if the SSB transmission failure rate is less than the threshold, the UE may determine to monitor a future discovery burst window according to the second mode for monitoring.

Figure 4:
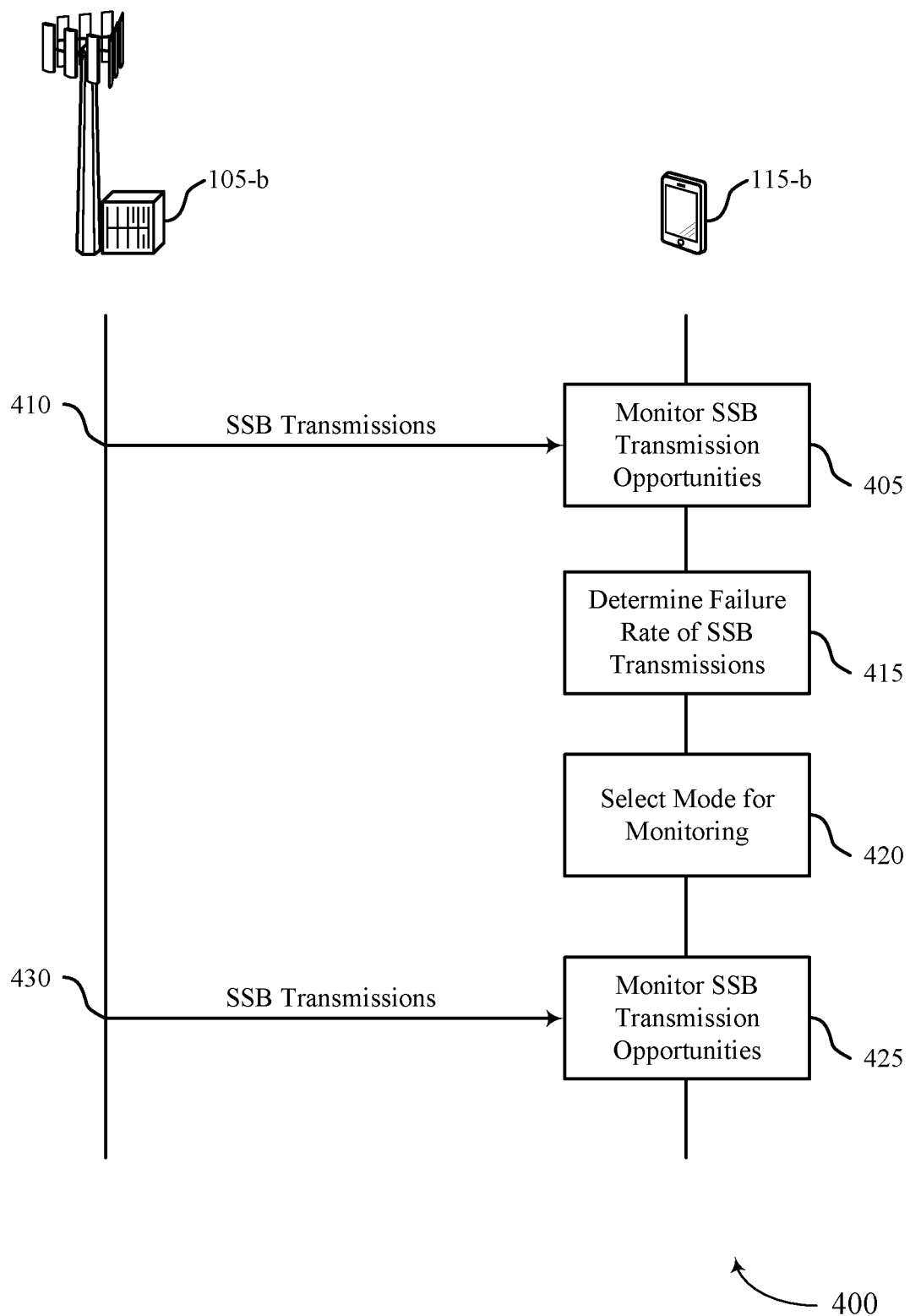
FIG. 4 illustrates an example of a process flow that supports dynamic monitoring modes for SSB transmissions in accordance with aspects of the present disclosure.

FIG. 4 illustrates an example of a process flow 400 that supports dynamic monitoring modes for SSB transmissions in accordance with aspects of the present disclosure. In some examples, process flow 400 may be implemented by aspects of wireless communications system 100. For example, the base station 105-*b* and UE 115-*b* may be examples of base stations 105 and UEs 115 as described with reference to FIGS. 1 through 3.

At 405, the UE 115-*b* may monitor one or more SSB transmission opportunities. For example, the UE 115-*b* may monitor one or more SSB transmission opportunities within a discovery burst window. In one case, the UE 115-*b* may be monitoring one or more SSB transmission opportunities according to a first mode for monitoring. That is, the UE 115-*b* may be configured to monitor a first quantity of SSB transmission opportunities (e.g., each associated with quasi-collocated SSB transmissions) within the discovery burst window. If the UE 115-*b* is monitoring the SSB transmission opportunities according to the first mode, the UE 115-*b* may refrain from monitoring one or more of the first quantity of SSB transmission opportunities. That is, the UE 115-*b* may detect a predefined quantity of SSB transmissions that satisfy a criterion (e.g., has an RSRP or signal to noise ratio that exceeds a threshold) and refrain from monitoring the remaining SSB transmission opportunities within that discovery burst window based on the predefined quantity of SSB transmissions satisfying the criterion.

In another case, the UE 115-*b* may be monitoring one or more SSB transmission opportunities according to a second mode for monitoring. That is, the UE 115-*b* may be configured to monitor a second quantity less than the first quantity of SSB transmission opportunities. For example, the UE 115-*b* may monitor a single SSB transmission opportunity within the discovery burst window.

At 410, the base station 105-*b* may transmit one or more SSB transmissions. The base station 105-*b* may perform an LBT procedure before transmitting an SSB transmission within each SSB transmission opportunity. In the case of an LBT failure, the base station 105-*b* may refrain from transmitting the SSB transmission during the SSB transmission opportunity. Additionally, in the case of an LBT success, the base station 105-*b* may transmit the SSB transmission during the SSB transmission opportunity. In some examples, the UE 115-*b* may monitor the one or more SSB transmission opportunities during a same time period that the base station 105-*b* transmits one or more SSB transmissions.

At 415, the UE 115-*b* may determine the failure rate of SSB transmissions. For example, the UE 115-*b* may determine an SSB transmission failure based on monitoring an SSB transmission opportunity and failing to detect an SSB transmission. Based on a quantity of SSB transmission failures, the UE 115-*b* may determine the failure rate of the SSB transmissions.

At 420, the UE 115-*b* may select a mode for monitoring one or more SSB transmission opportunities (e.g., within a future discovery burst window). The UE 115-*b* may select the mode for monitoring based on the failure rate of the SSB transmissions relative to a threshold. That is, the UE 115-*b* may compare the SSB failure rate to the threshold. If the SSB failure rate is greater than the threshold, the UE 115-*b* may select the first mode for monitoring a first quantity of SSB transmission opportunities. Additionally, if the SSB failure rate is less than the threshold, the UE 115-*b* may select the second mode for monitoring the second quantity of SSB transmission opportunities where the second quantity is less than the first quantity. In some examples, the threshold may be preconfigured for the UE 115-*b* according to a deployment implementation of the UE 115-*b*. That is, the threshold may be different (e.g., higher, lower) if the UE 115-*b* is deployed in an FBE deployment scenario versus an LBE deployment scenario.

At 425, the UE 115-*b* may monitor one or more transmission opportunities according to the first mode or second mode for monitoring (e.g., selected at 420). Additionally, at 430 the base station 105-*b* may transmit one or more SSB transmissions within the discovery burst window (e.g., based on performing one or more LBT procedures). In some examples, the UE 115-*b* may monitor the one or more SSB transmission opportunities during a same time period that the base station 105-*b* transmits one or more SSB transmissions.

Figure 5:
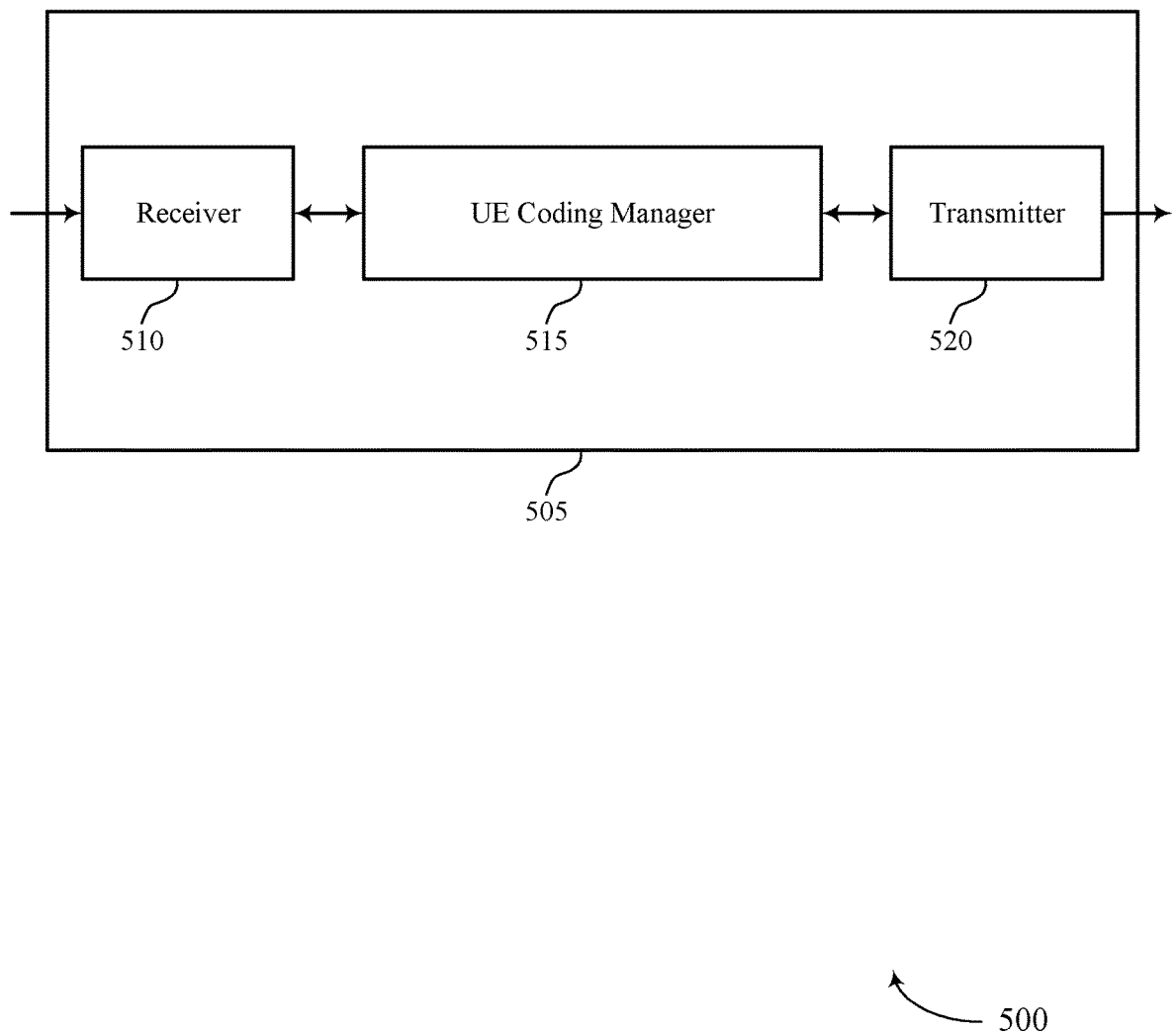
FIGS. 5 and 6 show block diagrams of devices that support dynamic monitoring modes for SSB transmissions in accordance with aspects of the present disclosure.

FIG. 5 shows a block diagram 500 of a device 505 that supports dynamic monitoring modes for SSB transmissions in accordance with aspects of the present disclosure. The device 505 may be an example of aspects of a UE 115 as described herein. The device 505 may include a receiver 510, a UE coding manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to dynamic monitoring modes for SSB transmissions, etc.). Information may be passed on to other components of the device 505. The receiver 510 may be an example of aspects of the transceiver 820 described with reference to FIG. 8. The receiver 510 may utilize a single antenna or a set of antennas.

The UE coding manager 515 may monitor one or more first SSB transmission opportunities for one or more SSB transmissions. The UE coding manager 515 may determine a failure rate of the one or more SSB transmissions based on monitoring the one or more first SSB transmission opportunities. The UE coding manager 515 may select a mode for monitoring one or more second SSB transmission opportunities based on the failure rate of the one or more SSB transmissions relative to a threshold, where selecting the mode for monitoring includes selecting the mode from a set that includes a first mode for monitoring a first quantity of the one or more second SSB transmission opportunities and a second mode for monitoring a second quantity less than the first quantity of the one or more second SSB transmission opportunities. The UE coding manager 515 may monitor at least one of the one or more second SSB transmission opportunities according to the mode for monitoring. The UE coding manager 515 may be an example of aspects of the UE coding manager 810 described herein.

The UE coding manager 515, or its sub-components, may be implemented in hardware, code (e.g., software or firmware) executed by a processor, or any combination thereof. If implemented in code executed by a processor, the functions of the UE coding manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE coding manager 515, or its sub-components, may be physically located at various positions, including being distributed such that portions of functions are implemented at different physical locations by one or more physical components. In some examples, the UE coding manager 515, or its sub-components, may be a separate and distinct component in accordance with various aspects of the present disclosure. In some examples, the UE coding manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
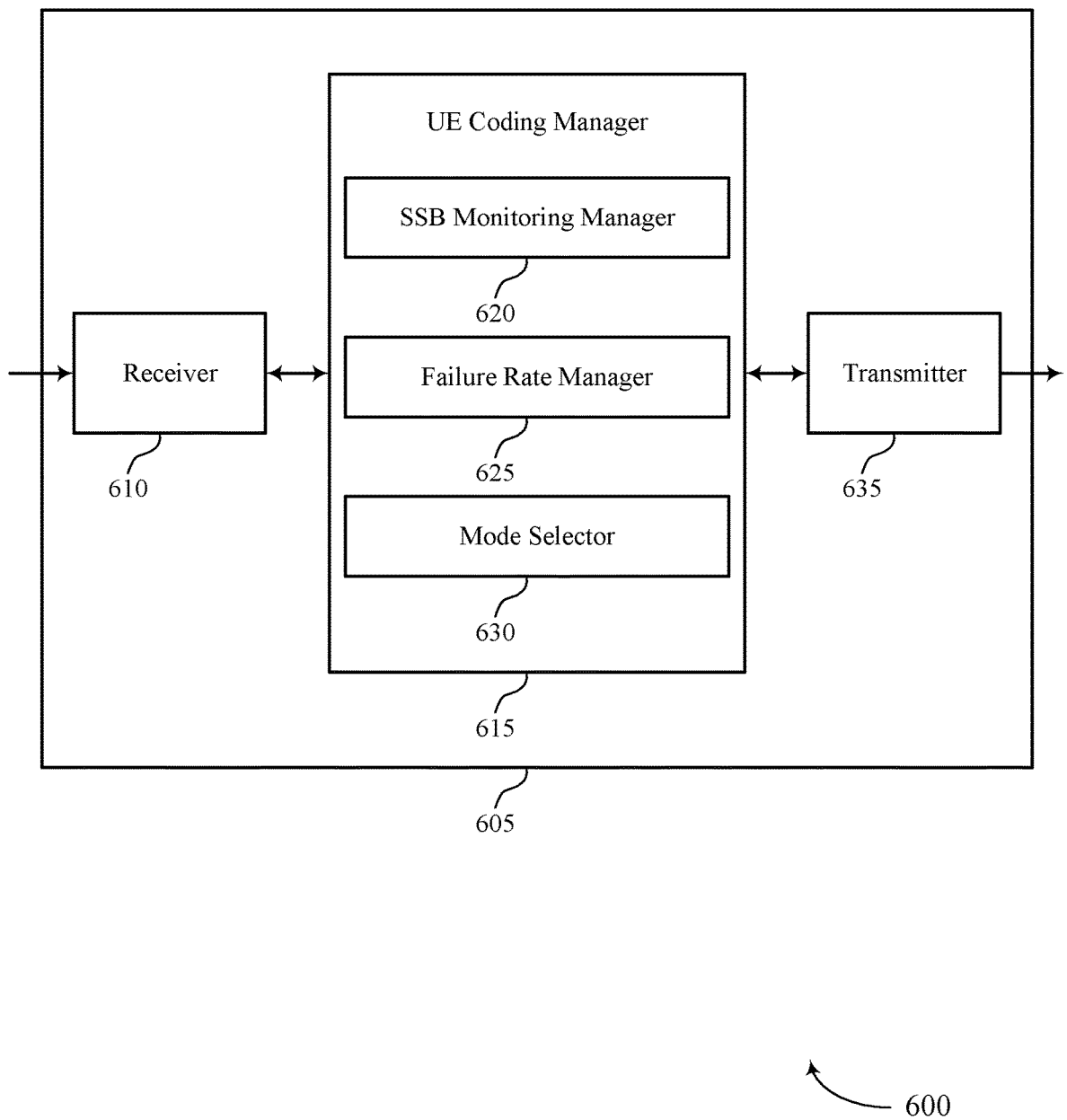

FIG. 6 shows a block diagram 600 of a device 605 that supports dynamic monitoring modes for SSB transmissions in accordance with aspects of the present disclosure. The device 605 may be an example of aspects of a device 505, or a UE 115 as described herein. The device 605 may include a receiver 610, a UE coding manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to dynamic monitoring modes for SSB transmissions, etc.). Information may be passed on to other components of the device 605. The receiver 610 may be an example of aspects of the transceiver 820 described with reference to FIG. 8. The receiver 610 may utilize a single antenna or a set of antennas.

The UE coding manager 615 may be an example of aspects of the UE coding manager 515 as described herein. The UE coding manager 615 may include an SSB monitoring manager 620, a failure rate manager 625, and a mode selector 630. The UE coding manager 615 may be an example of aspects of the UE coding manager 810 described herein.

The SSB monitoring manager 620 may monitor one or more first SSB transmission opportunities for one or more SSB transmissions. The SSB monitoring manager 620 may also monitor at least one of the one or more second SSB transmission opportunities according to the mode for monitoring (e.g., that is selected by the mode selector 630).

The failure rate manager 625 may determine a failure rate of the one or more SSB transmissions based on monitoring the one or more first SSB transmission opportunities.

The mode selector 630 may select a mode for monitoring one or more second SSB transmission opportunities based on the failure rate of the one or more SSB transmissions relative to a threshold, where selecting the mode for monitoring includes selecting the mode from a set that includes a first mode for monitoring a first quantity of the one or more second SSB transmission opportunities and a second mode for monitoring a second quantity less than the first quantity of the one or more second SSB transmission opportunities.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
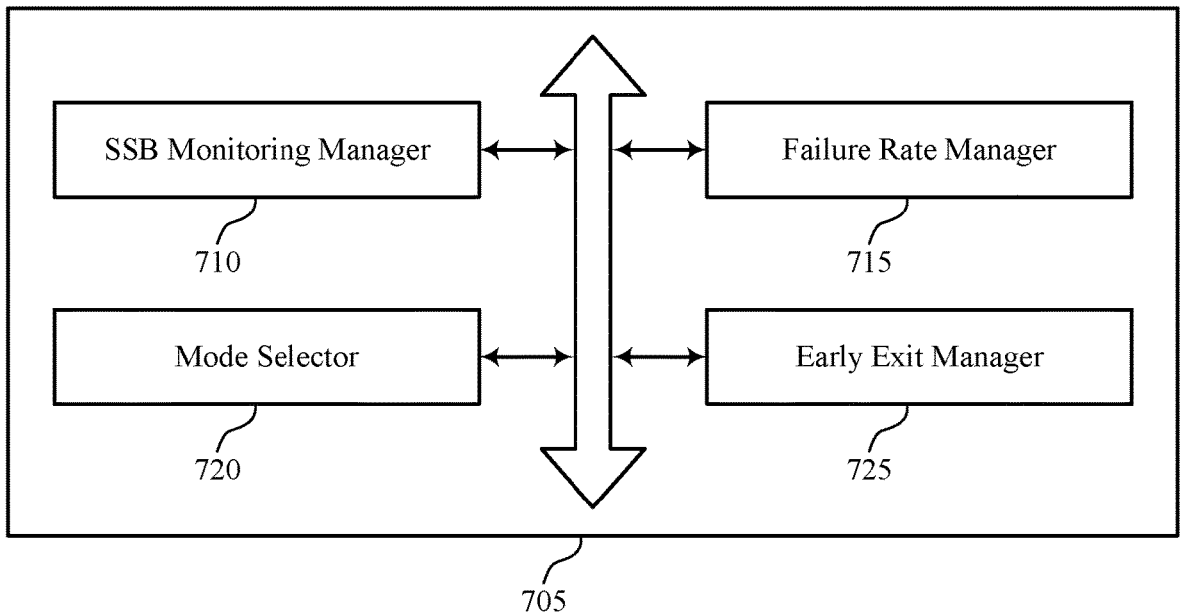
FIG. 7 shows a block diagram of a user equipment (UE) coding manager that supports dynamic monitoring modes for SSB transmissions in accordance with aspects of the present disclosure.

FIG. 7 shows a block diagram 700 of a UE coding manager 705 that supports dynamic monitoring modes for SSB transmissions in accordance with aspects of the present disclosure. The UE coding manager 705 may be an example of aspects of a UE coding manager 515, a UE coding manager 615, or a UE coding manager 810 described herein. The UE coding manager 705 may include an SSB monitoring manager 710, a failure rate manager 715, a mode selector 720, and an early exit manager 725. Each of these modules may communicate, directly or indirectly, with one another (e.g., via one or more buses).

The SSB monitoring manager 710 may monitor one or more first SSB transmission opportunities for one or more SSB transmissions. In some examples, monitoring the one or more first SSB transmission opportunities includes monitoring the one or more first SSB transmission opportunities according to the first mode or the second mode. In some examples, the SSB monitoring manager 710 may monitor at least one of the one or more second SSB transmission opportunities according to the mode for monitoring. In some examples, the SSB monitoring manager 710 may detect an SSB transmission based on monitoring at least one of the one or more second SSB transmission opportunities according to the first mode.

The failure rate manager 715 may determine a failure rate of the one or more SSB transmissions based on monitoring the one or more first SSB transmission opportunities. In some examples, the failure rate manager 715 may compare the failure rate of the one or more SSB transmissions to the threshold, where selecting the mode for monitoring one or more second SSB transmission opportunities is based on comparing the failure rate of the one or more SSB transmissions to the threshold. In some examples, the failure rate manager 715 may detect one or more SSB transmission failures based on failing to detect at least one SSB transmission, where determining the failure rate of the one or more SSB transmissions is based on the one or more detected SSB transmission failures. In some instances, determining the failure rate of the one or more SSB transmissions includes determining the failure rate of the one or more SSB transmissions based on a failure rate for a listen before talk procedure associated with a base station.

The mode selector 720 may select a mode for monitoring one or more second SSB transmission opportunities based on the failure rate of the one or more SSB transmissions relative to a threshold, where selecting the mode for monitoring includes selecting the mode from a set that includes a first mode for monitoring a first quantity of the one or more second SSB transmission opportunities and a second mode for monitoring a second quantity less than the first quantity of the one or more second SSB transmission opportunities. In some examples, the first quantity of the one or more second SSB transmission opportunities are associated with a first set of quasi-collocated SSB transmissions. In some examples, the second SSB transmission opportunities include a second set of quasi-collocated SSB transmissions that includes the first set of quasi-collocated SSB transmissions. In some examples, the second quantity of the one or more second SSB transmission opportunities includes a single SSB transmission opportunity of the one or more second SSB transmission opportunities.

In some examples, the mode selector 720 may select the first mode when the failure rate of the one or more SSB transmissions is greater than the threshold. Alternatively, the mode selector 720 may select the second mode when the failure rate of the one or more SSB transmissions is less than the threshold. In some examples, the threshold is preconfigured for the UE according to a deployment implementation of the UE, where selecting the mode for monitoring is based on the failure rate of the one or more SSB transmissions relative to the preconfigured threshold. In some instances, the deployment implementation of the UE includes a frame based equipment deployment scenario or a load based equipment deployment scenario.

The early exit manager 725 may determine that a predefined quantity of detected SSB transmissions satisfy a criterion. In some examples, the early exit manager 725 may refrain from monitoring at least one of the first quantity of the one or more second SSB transmission opportunities based on determining that the predefined quantity of detected SSB transmission satisfies the criterion. In some examples, the early exit manager 725 may determine that an SNR of the detected one or more SSB transmissions exceeds a second threshold. Additionally or alternatively, the early exit manager 725 may determine that a received signal power of the one or more detected SSB transmissions exceeds a second threshold.

Figure 8:
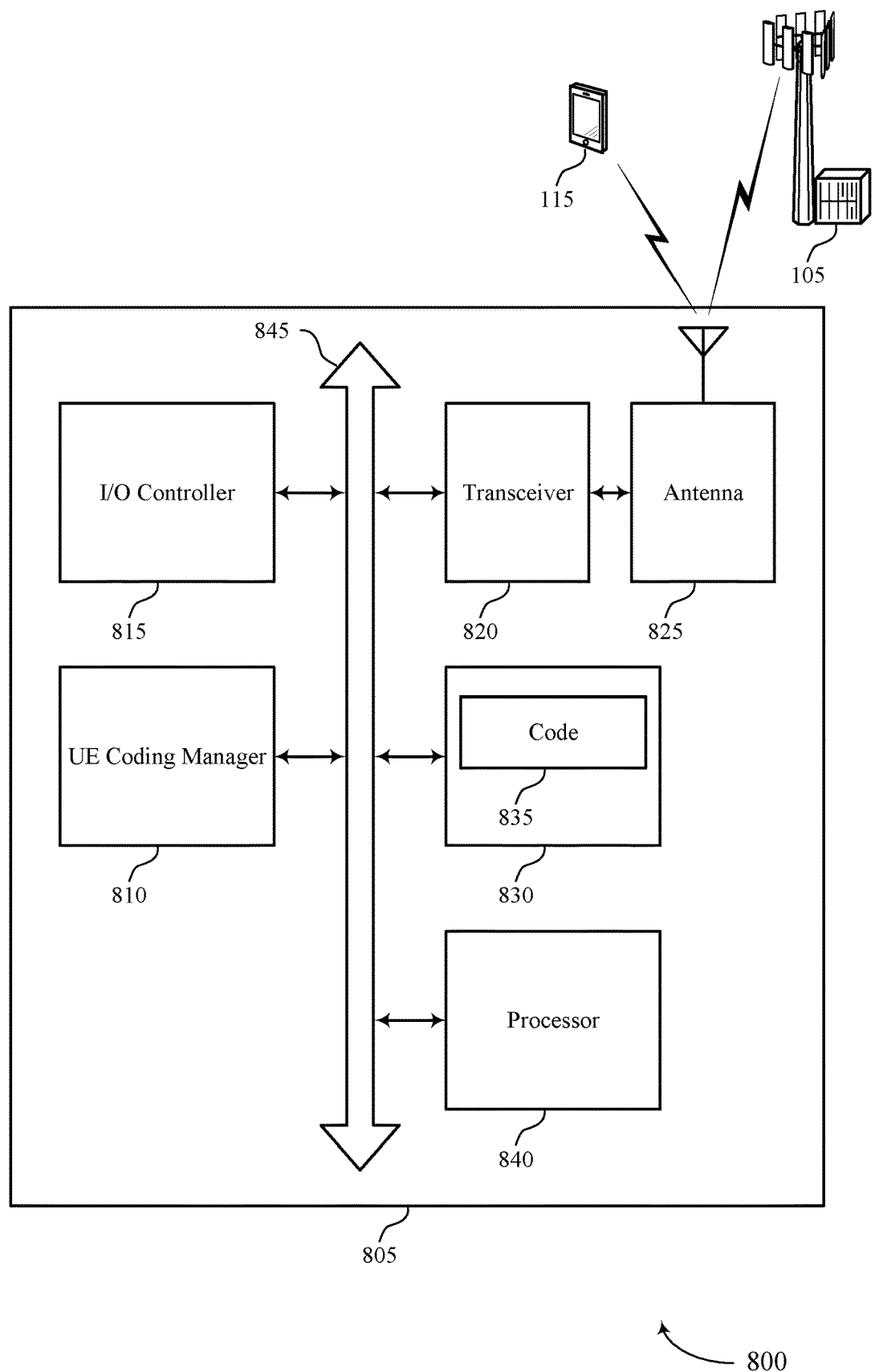
FIG. 8 shows a diagram of a system including a device that supports dynamic monitoring modes for SSB transmissions in accordance with aspects of the present disclosure.

FIG. 8 shows a diagram of a system 800 including a device 805 that supports dynamic monitoring modes for SSB transmissions in accordance with aspects of the present disclosure. The device 805 may be an example of or include the components of device 505, device 605, or a UE 115 as described herein. The device 805 may include components for bi-directional voice and data communications including components for transmitting and receiving communications, including a UE coding manager 810, an I/O controller 815, a transceiver 820, an antenna 825, memory 830, and a processor 840. These components may be in electronic communication via one or more buses (e.g., bus 845).

The UE coding manager 810 may monitor one or more first SSB transmission opportunities for one or more SSB transmissions. The UE coding manager 810 may also determine a failure rate of the one or more SSB transmissions based on monitoring the one or more first SSB transmission opportunities. The UE coding manager 810 may select a mode for monitoring one or more second SSB transmission opportunities based on the failure rate of the one or more SSB transmissions relative to a threshold, where selecting the mode for monitoring includes selecting the mode from a set that includes a first mode for monitoring a first quantity of the one or more second SSB transmission opportunities and a second mode for monitoring a second quantity less than the first quantity of the one or more second SSB transmission opportunities. The UE coding manager 810 may then monitor at least one of the one or more second SSB transmission opportunities according to the mode for monitoring.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include random-access memory (RAM) and read0only memory (ROM). The memory 830 may store computer-readable, computer-executable code 835 including instructions that, when executed, cause the processor to perform various functions described herein. In some examples, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic monitoring modes for SSB transmissions).

The code 835 may include instructions to implement aspects of the present disclosure, including instructions to support PREAMBLE. The code 835 may be stored in a non-transitory computer-readable medium such as system memory or other type of memory. In some examples, the code 835 may not be directly executable by the processor 840 but may cause a computer (e.g., when compiled and executed) to perform functions described herein.

Figure 9:
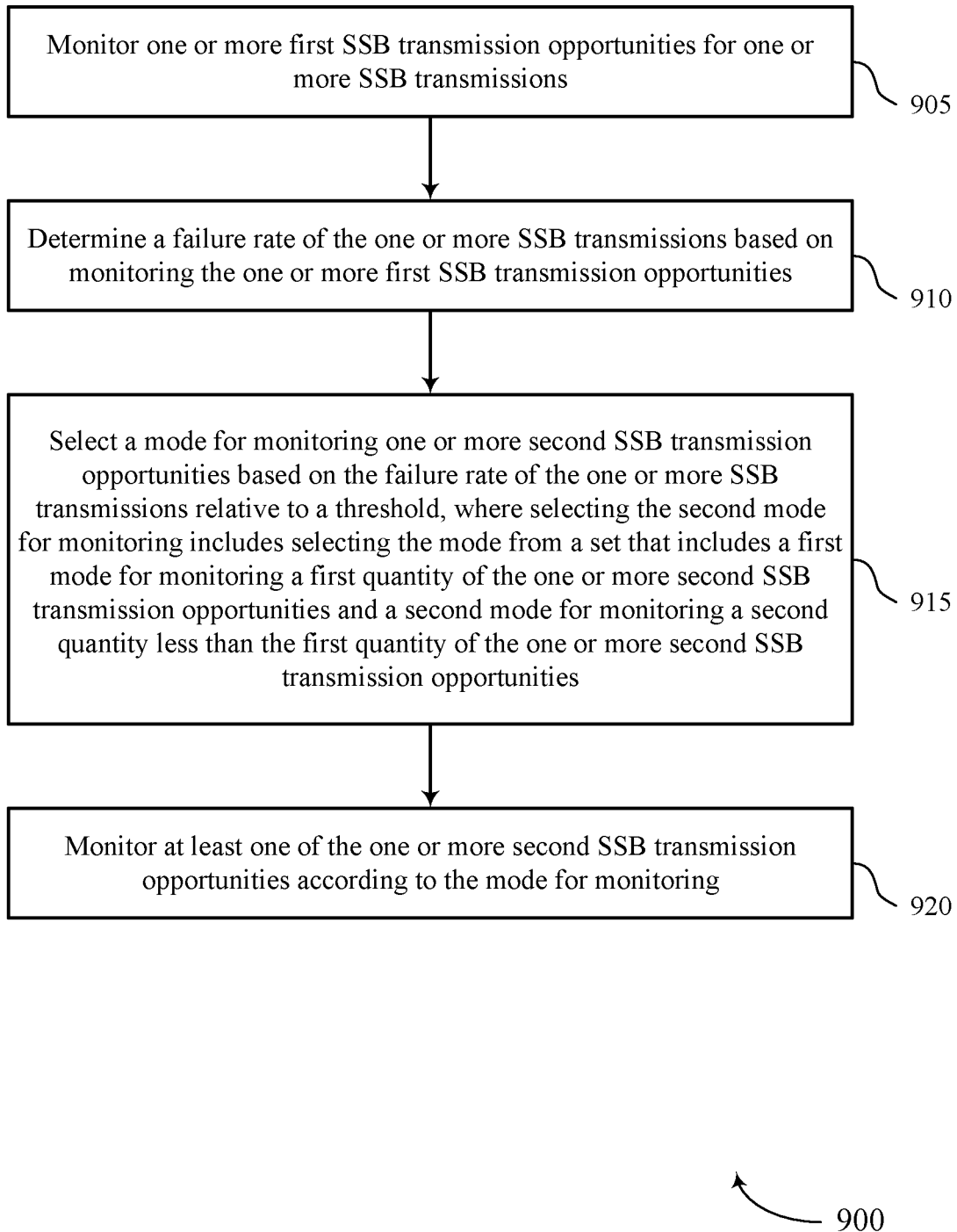
FIGS. 9 through 12 show flowcharts illustrating methods that support dynamic monitoring modes for SSB transmissions in accordance with aspects of the present disclosure.

FIG. 9 shows a flowchart illustrating a method 900 that supports dynamic monitoring modes for SSB transmissions in accordance with aspects of the present disclosure. The operations of method 900 may be implemented by a UE 115 or its components as described herein. For example, the operations of method 900 may be performed by a UE coding manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may monitor one or more first SSB transmission opportunities for one or more SSB transmissions. The operations of 905 may be performed according to the methods described herein. In some examples, aspects of the operations of 905 may be performed by an SSB monitoring manager as described with reference to FIGS. 5 through 8.

At 910, the UE may determine a failure rate of the one or more SSB transmissions based on monitoring the one or more first SSB transmission opportunities. The operations of 910 may be performed according to the methods described herein. In some examples, aspects of the operations of 910 may be performed by a failure rate manager as described with reference to FIGS. 5 through 8.

At 915, the UE may select a mode for monitoring one or more second SSB transmission opportunities based on the failure rate of the one or more SSB transmissions relative to a threshold, where selecting the mode for monitoring includes selecting the mode from a set that includes a first mode for monitoring a first quantity of the one or more second SSB transmission opportunities and a second mode for monitoring a second quantity less than the first quantity of the one or more second SSB transmission opportunities. The operations of 915 may be performed according to the methods described herein. In some examples, aspects of the operations of 915 may be performed by a mode selector as described with reference to FIGS. 5 through 8.

At 920, the UE may monitor at least one of the one or more second SSB transmission opportunities according to the mode for monitoring. The operations of 920 may be performed according to the methods described herein. In some examples, aspects of the operations of 920 may be performed by an SSB monitoring manager as described with reference to FIGS. 5 through 8.

Figure 10:
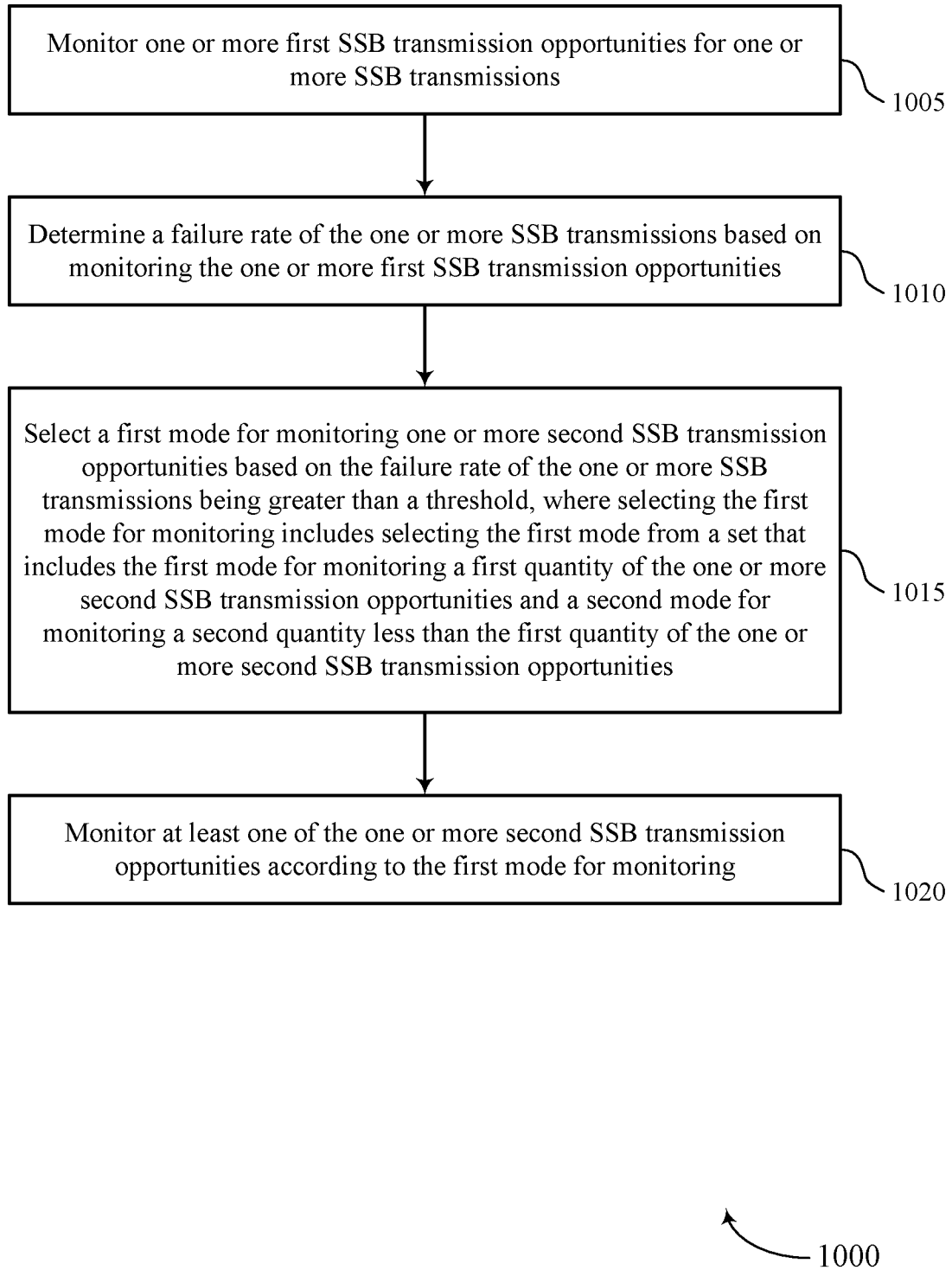

FIG. 10 shows a flowchart illustrating a method 1000 that supports dynamic monitoring modes for SSB transmissions in accordance with aspects of the present disclosure. The operations of method 1000 may be implemented by a UE 115 or its components as described herein. For example, the operations of method 1000 may be performed by a UE coding manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may monitor one or more first SSB transmission opportunities for one or more SSB transmissions. The operations of 1005 may be performed according to the methods described herein. In some examples, aspects of the operations of 1005 may be performed by an SSB monitoring manager as described with reference to FIGS. 5 through 8.

At 1010, the UE may determine a failure rate of the one or more SSB transmissions based on monitoring the one or more first SSB transmission opportunities. The operations of 1010 may be performed according to the methods described herein. In some examples, aspects of the operations of 1010 may be performed by a failure rate manager as described with reference to FIGS. 5 through 8.

At 1015, the UE may select a first mode for monitoring one or more second SSB transmission opportunities based on the failure rate of the one or more SSB transmissions being greater than a threshold, where selecting the first mode for monitoring includes selecting the first mode from a set that includes the first mode for monitoring a first quantity of the one or more second SSB transmission opportunities and a second mode for monitoring a second quantity less than the first quantity of the one or more second SSB transmission opportunities. The operations of 1015 may be performed according to the methods described herein. In some examples, aspects of the operations of 1015 may be performed by a mode selector as described with reference to FIGS. 5 through 8.

At 1020, the UE may monitor at least one of the one or more second SSB transmission opportunities according to the mode for monitoring. The operations of 1020 may be performed according to the methods described herein. In some examples, aspects of the operations of 1020 may be performed by an SSB monitoring manager as described with reference to FIGS. 5 through 8.

Figure 11:
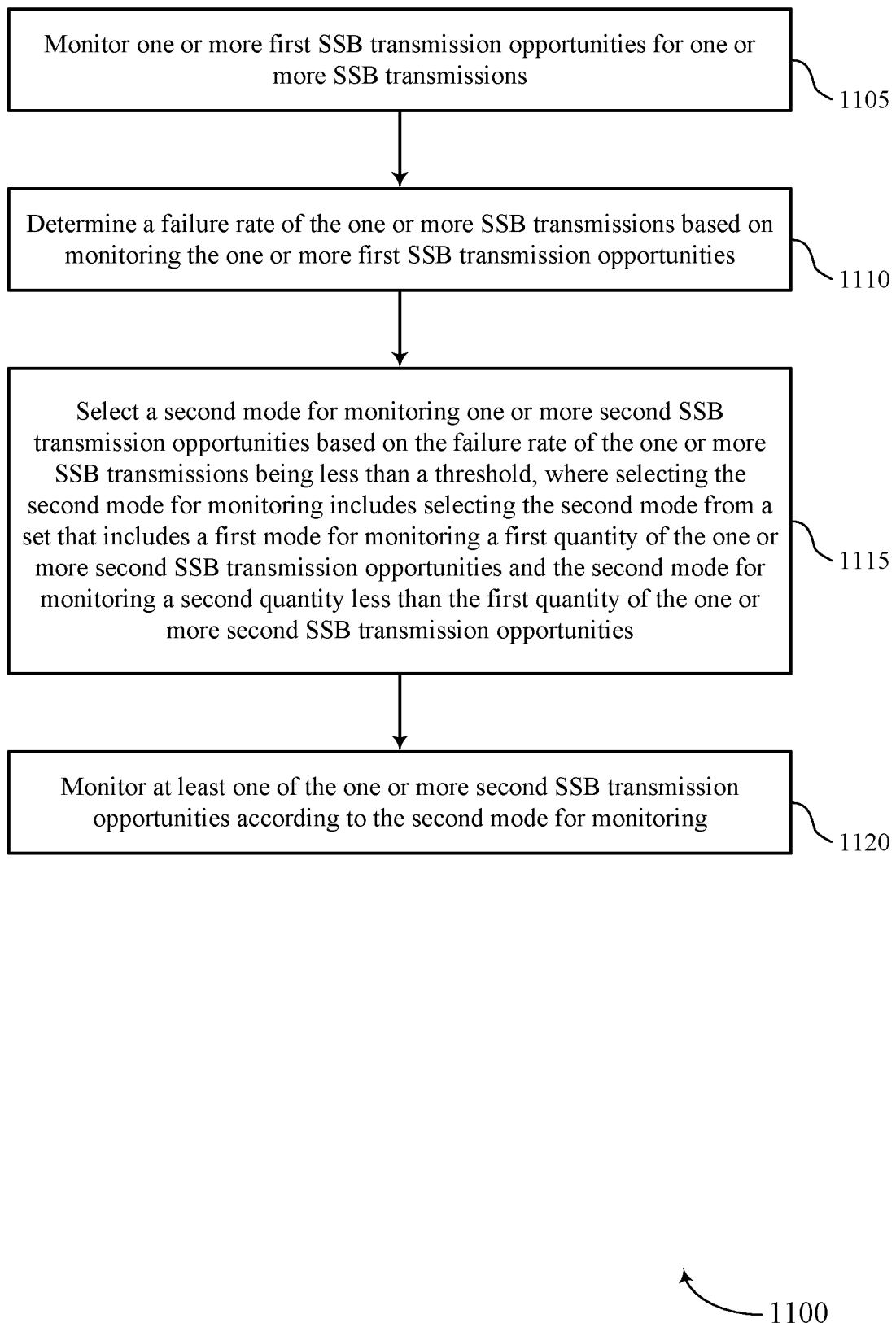

FIG. 11 shows a flowchart illustrating a method 1100 that supports dynamic monitoring modes for SSB transmissions in accordance with aspects of the present disclosure. The operations of method 1100 may be implemented by a UE 115 or its components as described herein. For example, the operations of method 1100 may be performed by a UE coding manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may monitor one or more first SSB transmission opportunities for one or more SSB transmissions. The operations of 1105 may be performed according to the methods described herein. In some examples, aspects of the operations of 1105 may be performed by an SSB monitoring manager as described with reference to FIGS. 5 through 8.

At 1110, the UE may determine a failure rate of the one or more SSB transmissions based on monitoring the one or more first SSB transmission opportunities. The operations of 1110 may be performed according to the methods described herein. In some examples, aspects of the operations of 1110 may be performed by a failure rate manager as described with reference to FIGS. 5 through 8.

At 1115, the UE may select a second mode for monitoring one or more second SSB transmission opportunities based on the failure rate of the one or more SSB transmissions being less than a threshold, where selecting the second mode for monitoring includes selecting the second mode from a set that includes a first mode for monitoring a first quantity of the one or more second SSB transmission opportunities and the second mode for monitoring a second quantity less than the first quantity of the one or more second SSB transmission opportunities. The operations of 1115 may be performed according to the methods described herein. In some examples, aspects of the operations of 1115 may be performed by a mode selector as described with reference to FIGS. 5 through 8.

At 1120, the UE may monitor at least one of the one or more second SSB transmission opportunities according to the mode for monitoring. The operations of 1120 may be performed according to the methods described herein. In some examples, aspects of the operations of 1120 may be performed by an SSB monitoring manager as described with reference to FIGS. 5 through 8.

Figure 12:
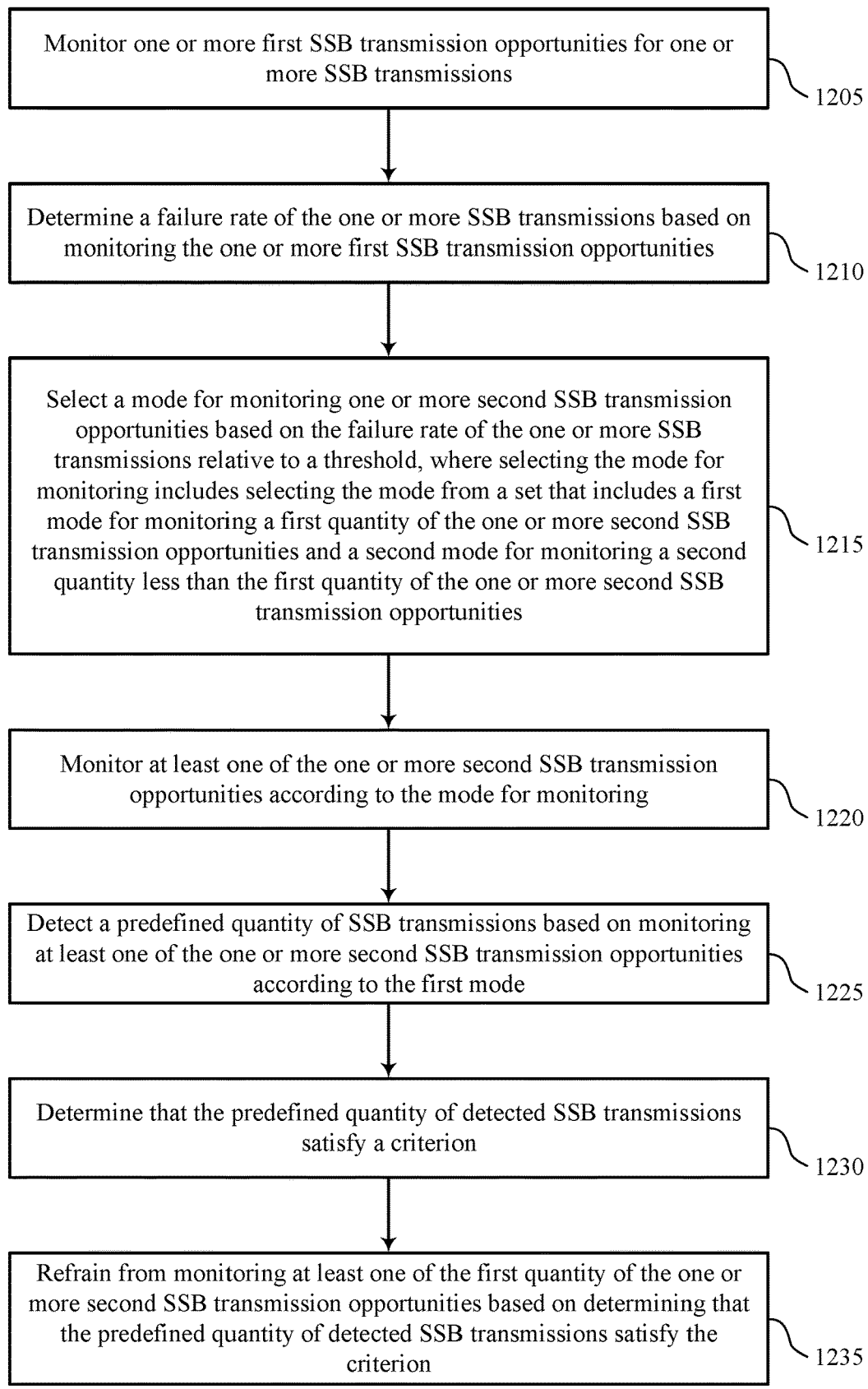

FIG. 12 shows a flowchart illustrating a method 1200 that supports dynamic monitoring modes for SSB transmissions in accordance with aspects of the present disclosure. The operations of method 1200 may be implemented by a UE 115 or its components as described herein. For example, the operations of method 1200 may be performed by a UE coding manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1205, the UE may monitor one or more first SSB transmission opportunities for one or more SSB transmissions. The operations of 1205 may be performed according to the methods described herein. In some examples, aspects of the operations of 1205 may be performed by an SSB monitoring manager as described with reference to FIGS. 5 through 8.

At 1210, the UE may determine a failure rate of the one or more SSB transmissions based on monitoring the one or more first SSB transmission opportunities. The operations of 1210 may be performed according to the methods described herein. In some examples, aspects of the operations of 1210 may be performed by a failure rate manager as described with reference to FIGS. 5 through 8.

At 1215, the UE may select a mode for monitoring one or more second SSB transmission opportunities based on the failure rate of the one or more SSB transmissions relative to a threshold, where selecting the mode for monitoring includes selecting the mode from a set that includes a first mode for monitoring a first quantity of the one or more second SSB transmission opportunities and a second mode for monitoring a second quantity less than the first quantity of the one or more second SSB transmission opportunities. The operations of 1215 may be performed according to the methods described herein. In some examples, aspects of the operations of 1215 may be performed by a mode selector as described with reference to FIGS. 5 through 8.

At 1220, the UE may monitor at least one of the one or more second SSB transmission opportunities according to the mode for monitoring. The operations of 1220 may be performed according to the methods described herein. In some examples, aspects of the operations of 1220 may be performed by an SSB monitoring manager as described with reference to FIGS. 5 through 8.

At 1225, the UE may detect an SSB transmission based on monitoring at least one of the one or more second SSB transmission opportunities according to the first mode. The operations of 1225 may be performed according to the methods described herein. In some examples, aspects of the operations of 1225 may be performed by an SSB monitoring manager as described with reference to FIGS. 5 through 8.

At 1230, the UE may determine that a predefined quantity of detected SSB transmissions satisfy a criterion. The operations of 1230 may be performed according to the methods described herein. In some examples, aspects of the operations of 1230 may be performed by an early exit manager as described with reference to FIGS. 5 through 8.

At 1235, the UE may refrain from monitoring at least one of the first quantity of the one or more second SSB transmission opportunities based on determining that the predefined quantity of detected SSB transmissions satisfy the criterion. The operations of 1235 may be performed according to the methods described herein. In some examples, aspects of the operations of 1235 may be performed by an early exit manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    monitoring one or more first synchronization signal block transmission opportunities for one or more synchronization signal block transmissions;
    determining a failure rate of the one or more synchronization signal block transmissions based at least in part on monitoring the one or more first synchronization signal block transmission opportunities;
    selecting, from a set that includes a first mode and a second mode, a mode for monitoring one or more second synchronization signal block transmission opportunities based at least in part on the failure rate of the one or more synchronization signal block transmissions relative to a threshold, wherein the first mode comprises monitoring a first quantity of the one or more second synchronization signal block transmission opportunities and the second mode comprises monitoring a second quantity less than the first quantity of the one or more second synchronization signal block transmission opportunities, and wherein the first quantity of the one or more second synchronization signal block transmission opportunities are associated with a first set of quasi-collocated synchronization signal block transmissions; and
    monitoring at least one of the one or more second synchronization signal block transmission opportunities according to the mode for monitoring.

2. The method of claim 1, wherein selecting the mode for monitoring the one or more second synchronization signal block transmission opportunities comprises:
    selecting the first mode when the failure rate of the one or more synchronization signal block transmissions is greater than the threshold; or
    selecting the second mode when the failure rate of the one or more synchronization signal block transmissions is less than the threshold.

3. The method of claim 1, wherein the one or more second synchronization signal block transmission opportunities comprise a second set of quasi-collocated synchronization signal block transmissions that comprises the first set of quasi-collocated synchronization signal block transmissions.

4. The method of claim 1, wherein the second quantity of the one or more second synchronization signal block transmission opportunities comprises a single synchronization signal block transmission opportunity of the one or more second synchronization signal block transmission opportunities.

5. The method of claim 1, further comprising:
    detecting one or more synchronization signal block transmissions based at least in part on monitoring at least one of the one or more second synchronization signal block transmission opportunities according to the first mode;
    determining that the one or more detected synchronization signal block transmissions satisfy a criterion; and
    refraining from monitoring at least one of the first quantity of the one or more second synchronization signal block transmission opportunities based at least in part on determining that the one or more detected synchronization signal block transmissions satisfy the criterion.

6. The method of claim 5, wherein determining that the one or more detected synchronization signal block transmissions satisfy the criterion comprises:
determining that a quantity of the one or more detected synchronization signal block transmissions that satisfy the criterion exceeds a quantity of at least one synchronization signal block transmission;
determining that a signal to noise ratio of the one or more detected synchronization signal block transmissions exceeds a second threshold; or
determining that a received signal power of the one or more detected synchronization signal block transmissions exceeds a third threshold.

7. The method of claim 1, further comprising:
comparing the failure rate of the one or more synchronization signal block transmissions to the threshold, wherein selecting the mode for monitoring the one or more second synchronization signal block transmission opportunities is based at least in part on comparing the failure rate of the one or more synchronization signal block transmissions to the threshold.

8. The method of claim 1, further comprising:
detecting one or more synchronization signal block transmission failures based at least in part on failing to detect at least one synchronization signal block transmission, wherein determining the failure rate of the one or more synchronization signal block transmissions is based at least in part on the one or more detected synchronization signal block transmission failures.

9. The method of claim 1, wherein:
monitoring the one or more first synchronization signal block transmission opportunities comprises monitoring the one or more first synchronization signal block transmission opportunities according to the first mode or the second mode.

10. The method of claim 1, wherein the threshold is preconfigured as a preconfigured threshold for the UE according to a deployment implementation of the UE, wherein selecting the mode for monitoring is based at least in part on the failure rate of the one or more synchronization signal block transmissions relative to the preconfigured threshold.

11. The method of claim 10, wherein the deployment implementation of the UE comprises a frame based equipment deployment scenario or a load based equipment deployment scenario.

12. A method for wireless communication at a user equipment (UE), comprising:
monitoring one or more first synchronization signal block transmission opportunities for one or more synchronization signal block transmissions;
determining a failure rate of the one or more synchronization signal block transmissions based at least in part on monitoring the one or more first synchronization signal block transmission opportunities, wherein determining the failure rate of the one or more synchronization signal block transmissions comprises determining the failure rate of the one or more synchronization signal block transmissions based at least in part on a second failure rate for a listen before talk procedure associated with a base station;
selecting, from a set that includes a first mode and a second mode, a mode for monitoring one or more second synchronization signal block transmission opportunities based at least in part on the failure rate of the one or more synchronization signal block transmissions relative to a threshold, wherein the first mode comprises monitoring a first quantity of the one or more second synchronization signal block transmission opportunities and the second mode comprises monitoring a second quantity less than the first quantity of the one or more second synchronization signal block transmission opportunities; and
monitoring at least one of the one or more second synchronization signal block transmission opportunities according to the mode for monitoring.

13. An apparatus for wireless communication at a user equipment (UE), comprising:
a processor; and
a memory coupled with the processor, with instructions stored in the memory, the instructions being executable by the processor to cause the apparatus to:
monitor one or more first synchronization signal block transmission opportunities for one or more synchronization signal block transmissions;
determine a failure rate of the one or more synchronization signal block transmissions based at least in part on monitoring the one or more first synchronization signal block transmission opportunities;
select, from a set that includes a first mode and a second mode, a mode for monitoring one or more second synchronization signal block transmission opportunities based at least in part on the failure rate of the one or more synchronization signal block transmissions relative to a threshold, wherein the first mode comprises monitoring a first quantity of the one or more second synchronization signal block transmission opportunities and the second mode comprises monitoring a second quantity less than the first quantity of the one or more second synchronization signal block transmission opportunities, and wherein the first quantity of the one or more second synchronization signal block transmission opportunities are associated with a first set of quasi-collocated synchronization signal block transmissions; and
monitor at least one of the one or more second synchronization signal block transmission opportunities according to the mode for monitoring.

14. The apparatus of claim 13, wherein the instructions to select the mode for monitoring the one or more second synchronization signal block transmission opportunities are executable by the processor to cause the apparatus to:
select the first mode when the failure rate of the one or more synchronization signal block transmissions is greater than the threshold; or
select the second mode when the failure rate of the one or more synchronization signal block transmissions is less than the threshold.

15. The apparatus of claim 13, wherein the one or more second synchronization signal block transmission opportunities comprise a second set of quasi-collocated synchronization signal block transmissions that comprises the first set of quasi-collocated synchronization signal block transmissions.

16. The apparatus of claim 13, wherein the second quantity of the one or more second synchronization signal block transmission opportunities comprises a single synchronization signal block transmission opportunity of the one or more second synchronization signal block transmission opportunities.

17. The apparatus of claim 13, wherein the instructions are further executable by the processor to cause the apparatus to:
- detect one or more synchronization signal block transmissions based at least in part on monitoring at least one of the one or more second synchronization signal block transmission opportunities according to the first mode;
- determine that the one or more detected synchronization signal block transmissions satisfy a criterion; and
- refrain from monitoring at least one of the first quantity of the one or more second synchronization signal block transmission opportunities based at least in part on determining that the one or more detected synchronization signal block transmissions satisfy the criterion.

18. The apparatus of claim 17, wherein the instructions to determine that the detected synchronization signal block transmission satisfies the criterion are executable by the processor to cause the apparatus to:
- determine that a quantity of the one or more detected synchronization signal block transmissions that satisfy the criterion exceeds a quantity of at least one synchronization signal block transmission;
- determine that a signal to noise ratio of the one or more detected synchronization signal block transmissions exceeds a second threshold; or
- determine that a received signal power of the one or more detected synchronization signal block transmissions exceeds a third threshold.

19. The apparatus of claim 13, wherein the instructions are further executable by the processor to cause the apparatus to:
- compare the failure rate of the one or more synchronization signal block transmissions to the threshold, wherein selecting the mode for monitoring the one or more second synchronization signal block transmission opportunities is based at least in part on comparing the failure rate of the one or more synchronization signal block transmissions to the threshold.

20. The apparatus of claim 13, wherein the instructions are further executable by the processor to cause the apparatus to:
- detect one or more synchronization signal block transmission failures based at least in part on failing to detect at least one synchronization signal block transmission, wherein determining the failure rate of the one or more synchronization signal block transmissions is based at least in part on the one or more detected synchronization signal block transmission failures.

21. The apparatus of claim 13, wherein the instructions to monitor the one or more first synchronization signal block transmission opportunities are executable by the processor to cause the apparatus to monitor the one or more first synchronization signal block transmission opportunities according to the first mode or the second mode.

22. The apparatus of claim 13, wherein the threshold is preconfigured as a preconfigured threshold for the UE according to a deployment implementation of the UE, wherein selecting the mode for monitoring is based at least in part on the failure rate of the one or more synchronization signal block transmissions relative to the preconfigured threshold.

23. The apparatus of claim 22, wherein the deployment implementation of the UE comprises a frame based equipment deployment scenario or a load based equipment deployment scenario.

24. The apparatus of claim 13, wherein the instructions to determine the failure rate of the one or more synchronization signal block transmissions are executable by the processor to cause the apparatus to determine the failure rate of the one or more synchronization signal block transmissions based at least in part on a second failure rate for a listen before talk procedure associated with a base station.

25. An apparatus for wireless communication at a user equipment (UE), comprising:
- means for monitoring one or more first synchronization signal block transmission opportunities for one or more synchronization signal block transmissions;
- means for determining a failure rate of the one or more synchronization signal block transmissions based at least in part on monitoring the one or more first synchronization signal block transmission opportunities;
- means for selecting, from a set that includes a first mode and a second mode, a mode for monitoring one or more second synchronization signal block transmission opportunities based at least in part on the failure rate of the one or more synchronization signal block transmissions relative to a threshold, wherein the first mode comprises monitoring a first quantity of the one or more second synchronization signal block transmission opportunities and the second mode comprises monitoring a second quantity less than the first quantity of the one or more second synchronization signal block transmission opportunities, and wherein the first quantity of the one or more second synchronization signal block transmission opportunities are associated with a first set of quasi-collocated synchronization signal block transmissions; and
- means for monitoring at least one of the one or more second synchronization signal block transmission opportunities according to the mode for monitoring.

26. The apparatus of claim 25, wherein the means for selecting the mode for monitoring the one or more second synchronization signal block transmission opportunities comprises:
- means for selecting the first mode when the failure rate of the one or more synchronization signal block transmissions is greater than the threshold; or
- means for selecting the second mode when the failure rate of the one or more synchronization signal block transmissions is less than the threshold.

27. A non-transitory computer-readable medium storing code for wireless communication at a user equipment (UE), the code comprising instructions executable by a processor to:
- monitor one or more first synchronization signal block transmission opportunities for one or more synchronization signal block transmissions;
- determine a failure rate of the one or more synchronization signal block transmissions based at least in part on monitoring the one or more first synchronization signal block transmission opportunities;
- select, from a set that includes a first mode and a second mode, a mode for monitoring one or more second synchronization signal block transmission opportunities based at least in part on the failure rate of the one or more synchronization signal block transmissions relative to a threshold, wherein the first mode comprises monitoring a first quantity of the one or more second synchronization signal block transmission opportunities and the second mode comprises monitoring a second quantity less than the first quantity of the one or more second synchronization signal block transmission opportunities, and wherein the first quantity of the one or more second synchronization signal block transmission opportunities are associated with a first set of quasi-collocated synchronization signal block transmissions; and monitor at least one of the one or more second synchronization signal block transmission opportunities according to the mode for monitoring.

28. The non-transitory computer-readable medium of claim 27, wherein the instructions to select the mode for monitoring the one or more second synchronization signal block transmission opportunities are executable to:

select the first mode when the failure rate of the one or more synchronization signal block transmissions is greater than the threshold; or select the second mode when the failure rate of the one or more synchronization signal block transmissions is less than the threshold.

* * * * *